US010671721B1

(12) United States Patent
Otvagin et al.

(10) Patent No.: US 10,671,721 B1
(45) Date of Patent: Jun. 2, 2020

(54) TIMEOUT MANAGEMENT SERVICES

(71) Applicant: FIREEYE, INC., Milpitas, CA (US)

(72) Inventors: Alexander Otvagin, Milpitas, CA (US); Mumtaz Siddiqui, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 100 days.

(21) Appl. No.: 15/390,930

(22) Filed: Dec. 27, 2016

Related U.S. Application Data

(60) Provisional application No. 62/402,961, filed on Sep. 30, 2016, provisional application No. 62/313,643, (Continued)

(51) Int. Cl.
*G06F 21/56* (2013.01)
*G06F 21/57* (2013.01)
(Continued)

(52) U.S. Cl.
CPC .............. *G06F 21/53* (2013.01); *G06F 21/56* (2013.01); *G06F 21/577* (2013.01);
(Continued)

(58) Field of Classification Search
CPC .... G06F 17/3087; G06F 1/163; G06F 1/1652; G06F 2203/04102; G06F 2203/04105;
(Continued)

(56) References Cited

U.S. PATENT DOCUMENTS 4,292,580 A 9/1981 Ott et al.
5,175,732 A 12/1992 Hendel et al.
(Continued)

FOREIGN PATENT DOCUMENTS

GB 2439806 A 1/2008
GB 2448065 A * 10/2008 .......... G06F 11/1448
(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.
(Continued)

*Primary Examiner* — Alexander Lagor
*Assistant Examiner* — Howard H. Louie
(74) *Attorney, Agent, or Firm* — Rutan & Tucker, LLP

(57) ABSTRACT

A scalable, threat detection system features computing nodes including a first computing node and a second computing node operating as a cluster. Each computing node features an analysis coordinator and an object analyzer. The analysis coordinator is configured to conduct an analysis of metadata associated with a suspicious object that is to be analyzed for malware, where the metadata being received from a remotely located network device and to store a portion of the metadata within a data store. The object analyzer is configured to retrieve the portion of the metadata from the data store, monitor a duration of retention of the metadata in the data store, and determine whether a timeout event has occurred for the object associated with the metadata based on retention of the metadata within the data store that exceeds a timeout value included as part of the metadata associated with the suspicious object for malware.

30 Claims, 9 Drawing Sheets

Related U.S. Application Data filed on Mar. 25, 2016, provisional application No. 62/313,639, filed on Mar. 25, 2016.

(51) Int. Cl.
*G06F 21/53* (2013.01)
*H04L 29/06* (2006.01)
*H04W 12/12* (2009.01)

(52) U.S. Cl.
CPC ....... *H04L 63/145* (2013.01); *H04W 12/1208* (2019.01); *G06F 2221/033* (2013.01); *G06F 2221/2151* (2013.01)

(58) Field of Classification Search
CPC .... G06F 21/53; G06F 2221/033; G06F 21/56; G06F 21/577; G06F 2221/2151; G06F 1/1632; G06F 21/31; H04W 12/1208; H04L 63/145
See application file for complete search history.

(56) References Cited

U.S. PATENT DOCUMENTS

| | | | |
|---|---|---|---|
| 5,319,776 | A | 6/1994 | Hile et al. |
| 5,440,723 | A | 8/1995 | Arnold et al. |
| 5,490,249 | A | 2/1996 | Miller |
| 5,657,473 | A | 8/1997 | Killean et al. |
| 5,802,277 | A | 9/1998 | Cowland |
| 5,828,847 | A * | 10/1998 | Gehr ............... H04L 29/06 709/239 |
| 5,842,002 | A | 11/1998 | Schnurer et al. |
| 5,960,170 | A | 9/1999 | Chen et al. |
| 5,978,917 | A | 11/1999 | Chi |
| 5,983,348 | A | 11/1999 | Ji |
| 6,032,189 | A * | 2/2000 | Jinzenji ............... H04L 29/06 370/230 |
| 6,088,803 | A | 7/2000 | Tso et al. |
| 6,092,194 | A | 7/2000 | Touboul |
| 6,094,677 | A | 7/2000 | Capek et al. |
| 6,108,799 | A | 8/2000 | Boulay et al. |
| 6,154,844 | A | 11/2000 | Touboul et al. |
| 6,195,680 | B1 * | 2/2001 | Goldszmidt ............ H04L 12/56 709/203 |
| 6,269,330 | B1 | 7/2001 | Cidon et al. |
| 6,272,641 | B1 | 8/2001 | Ji |
| 6,279,113 | B1 | 8/2001 | Vaidya |
| 6,298,445 | B1 | 10/2001 | Shostack et al. |
| 6,357,008 | B1 | 3/2002 | Nachenberg |
| 6,424,627 | B1 | 7/2002 | Sorhaug et al. |
| 6,442,696 | B1 | 8/2002 | Wray et al. |
| 6,484,315 | B1 | 11/2002 | Ziese |
| 6,487,666 | B1 | 11/2002 | Shanklin et al. |
| 6,493,756 | B1 | 12/2002 | O'Brien et al. |
| 6,550,012 | B1 | 4/2003 | Villa et al. |
| 6,775,657 | B1 | 8/2004 | Baker |
| 6,831,893 | B1 | 12/2004 | Ben Nun et al. |
| 6,832,367 | B1 | 12/2004 | Choi et al. |
| 6,895,550 | B2 | 5/2005 | Kanchirayappa et al. |
| 6,898,632 | B2 | 5/2005 | Gordy et al. |
| 6,907,396 | B1 | 6/2005 | Muttik et al. |
| 6,941,348 | B2 | 9/2005 | Petry et al. |
| 6,971,097 | B1 | 11/2005 | Wallman |
| 6,981,279 | B1 | 12/2005 | Arnold et al. |
| 7,007,107 | B1 | 2/2006 | Ivchenko et al. |
| 7,028,179 | B2 | 4/2006 | Anderson et al. |
| 7,043,757 | B2 | 5/2006 | Hoefelmeyer et al. |
| 7,058,822 | B2 | 6/2006 | Edery et al. |
| 7,069,316 | B1 | 6/2006 | Gryaznov |
| 7,080,407 | B1 | 7/2006 | Zhao et al. |
| 7,080,408 | B1 | 7/2006 | Pak et al. |
| 7,093,002 | B2 | 8/2006 | Wolff et al. |
| 7,093,239 | B1 | 8/2006 | van der Made |
| 7,096,498 | B2 | 8/2006 | Judge |
| 7,100,201 | B2 | 8/2006 | Izatt |
| 7,107,617 | B2 | 9/2006 | Hursey et al. |
| 7,159,149 | B2 | 1/2007 | Spiegel et al. |
| 7,188,367 | B1 | 3/2007 | Edwards et al. |
| 7,213,260 | B2 | 5/2007 | Judge |
| 7,231,667 | B2 | 6/2007 | Jordan |
| 7,240,364 | B1 | 7/2007 | Branscomb et al. |
| 7,240,368 | B1 | 7/2007 | Roesch et al. |
| 7,243,371 | B1 | 7/2007 | Kasper et al. |
| 7,249,175 | B1 | 7/2007 | Donaldson |
| 7,287,278 | B2 | 10/2007 | Liang |
| 7,308,716 | B2 | 12/2007 | Danford et al. |
| 7,328,453 | B2 | 2/2008 | Merkle, Jr. et al. |
| 7,346,486 | B2 | 3/2008 | Ivancic et al. |
| 7,356,736 | B2 | 4/2008 | Natvig |
| 7,386,888 | B2 | 6/2008 | Liang et al. |
| 7,392,542 | B2 | 6/2008 | Bucher |
| 7,418,729 | B2 | 8/2008 | Szor |
| 7,428,300 | B1 | 9/2008 | Drew et al. |
| 7,441,272 | B2 | 10/2008 | Durham et al. |
| 7,448,084 | B1 | 11/2008 | Apap et al. |
| 7,458,098 | B2 | 11/2008 | Judge et al. |
| 7,464,404 | B2 | 12/2008 | Carpenter et al. |
| 7,464,407 | B2 | 12/2008 | Nakae et al. |
| 7,467,408 | B1 | 12/2008 | O'Toole, Jr. |
| 7,478,428 | B1 | 1/2009 | Thomlinson |
| 7,480,773 | B1 | 1/2009 | Reed |
| 7,487,543 | B2 | 2/2009 | Arnold et al. |
| 7,492,780 | B1 * | 2/2009 | Goolsby ............... H04L 49/90 370/412 |
| 7,496,960 | B1 | 2/2009 | Chen et al. |
| 7,496,961 | B2 | 2/2009 | Zimmer et al. |
| 7,519,990 | B1 | 4/2009 | Xie |
| 7,523,493 | B2 | 4/2009 | Liang et al. |
| 7,530,104 | B1 | 5/2009 | Thrower et al. |
| 7,540,025 | B2 | 5/2009 | Tzadikario |
| 7,546,638 | B2 | 6/2009 | Anderson et al. |
| 7,565,550 | B2 | 7/2009 | Liang et al. |
| 7,568,233 | B1 | 7/2009 | Szor et al. |
| 7,584,455 | B2 | 9/2009 | Ball |
| 7,603,715 | B2 | 10/2009 | Costa et al. |
| 7,607,171 | B1 | 10/2009 | Marsden et al. |
| 7,639,714 | B2 | 12/2009 | Stolfo et al. |
| 7,644,438 | B1 * | 1/2010 | Dash ................ H04L 63/0218 703/17 |
| 7,644,441 | B2 | 1/2010 | Schmid et al. |
| 7,653,592 | B1 * | 1/2010 | Flaxman ............... G06Q 40/00 705/35 |
| 7,657,419 | B2 | 2/2010 | van der Made |
| 7,676,841 | B2 | 3/2010 | Sobchuk et al. |
| 7,698,548 | B2 | 4/2010 | Shelest et al. |
| 7,707,633 | B2 | 4/2010 | Danford et al. |
| 7,712,136 | B2 | 5/2010 | Sprosts et al. |
| 7,730,011 | B1 | 6/2010 | Deninger et al. |
| 7,739,740 | B1 | 6/2010 | Nachenberg et al. |
| 7,779,463 | B2 | 8/2010 | Stolfo et al. |
| 7,784,097 | B1 | 8/2010 | Stolfo et al. |
| 7,832,008 | B1 | 11/2010 | Kraemer |
| 7,836,502 | B1 | 11/2010 | Zhao et al. |
| 7,849,506 | B1 | 12/2010 | Dansey et al. |
| 7,854,007 | B2 | 12/2010 | Sprosts et al. |
| 7,865,614 | B2 | 1/2011 | Lu et al. |
| 7,869,073 | B2 | 1/2011 | Oshima |
| 7,877,803 | B2 | 1/2011 | Enstone et al. |
| 7,904,959 | B2 | 3/2011 | Sidiroglou et al. |
| 7,908,660 | B2 | 3/2011 | Bahl |
| 7,930,738 | B1 | 4/2011 | Petersen |
| 7,937,387 | B2 | 5/2011 | Frazier et al. |
| 7,937,760 | B2 * | 5/2011 | Ross .................... G06F 21/554 726/22 |
| 7,937,761 | B1 | 5/2011 | Bennett |
| 7,949,849 | B2 | 5/2011 | Lowe et al. |
| 7,971,208 | B2 * | 6/2011 | Stokes ................. G06F 8/20 382/162 |
| 7,996,556 | B2 | 8/2011 | Raghavan et al. |
| 7,996,836 | B1 | 8/2011 | McCorkendale et al. |
| 7,996,904 | B1 | 8/2011 | Chiueh et al. |
| 7,996,905 | B2 | 8/2011 | Arnold et al. |
| 8,006,305 | B2 | 8/2011 | Aziz |
| 8,010,667 | B2 | 8/2011 | Zhang et al. |

(56) References Cited

U.S. PATENT DOCUMENTS

| | | | |
|---|---|---|---|
| 8,020,206 B2 | 9/2011 | Hubbard et al. | |
| 8,028,338 B1 | 9/2011 | Schneider et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,065,660 B1* | 11/2011 | Tanner | G06F 8/20 709/223 |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,176,049 B2 | 5/2012 | Deninger et al. | |
| 8,176,480 B1 | 5/2012 | Spertus | |
| 8,201,246 B1 | 6/2012 | Wu et al. | |
| 8,204,984 B1 | 6/2012 | Aziz et al. | |
| 8,214,905 B1 | 7/2012 | Doukhvalov et al. | |
| 8,220,054 B1 | 7/2012 | Lu | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,640 B1 | 7/2012 | Fitzgerald et al. | |
| 8,234,709 B2 | 7/2012 | Viljoen et al. | |
| 8,239,944 B1 | 8/2012 | Nachenberg et al. | |
| 8,260,914 B1 | 9/2012 | Ranjan | |
| 8,266,091 B1 | 9/2012 | Gubin et al. | |
| 8,286,251 B2 | 10/2012 | Eker et al. | |
| 8,291,499 B2 | 10/2012 | Aziz et al. | |
| 8,302,192 B1 | 10/2012 | Cnudde et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,332,571 B1 | 12/2012 | Edwards, Sr. | |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,464,340 B2 | 6/2013 | Ahn et al. | |
| 8,468,602 B2 | 6/2013 | McDougal et al. | |
| 8,479,174 B2 | 7/2013 | Chiriac | |
| 8,479,276 B1 | 7/2013 | Vaystikh et al. | |
| 8,479,291 B1 | 7/2013 | Bodke | |
| 8,510,827 B1 | 8/2013 | Leake et al. | |
| 8,510,828 B1 | 8/2013 | Guo et al. | |
| 8,510,842 B2 | 8/2013 | Amit et al. | |
| 8,516,478 B1 | 8/2013 | Edwards et al. | |
| 8,516,590 B1 | 8/2013 | Ranadive et al. | |
| 8,516,593 B2 | 8/2013 | Aziz | |
| 8,522,348 B2 | 8/2013 | Chen et al. | |
| 8,528,086 B1 | 9/2013 | Aziz | |
| 8,533,824 B2 | 9/2013 | Hutton et al. | |
| 8,539,582 B1 | 9/2013 | Aziz et al. | |
| 8,549,638 B2 | 10/2013 | Aziz | |
| 8,555,391 B1 | 10/2013 | Demir et al. | |
| 8,561,177 B1 | 10/2013 | Aziz et al. | |
| 8,566,476 B2 | 10/2013 | Shiffer et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,682,054 B2 | 3/2014 | Xue et al. | |
| 8,682,812 B1 | 3/2014 | Ranjan | |
| 8,689,333 B2 | 4/2014 | Aziz | |
| 8,695,096 B1 | 4/2014 | Zhang | |
| 8,713,631 B1 | 4/2014 | Pavlyushchik | |
| 8,713,681 B2 | 4/2014 | Silberman et al. | |
| 8,726,392 B1 | 5/2014 | McCorkendale et al. | |
| 8,739,280 B2 | 5/2014 | Chess et al. | |
| 8,776,229 B1 | 7/2014 | Aziz | |
| 8,782,788 B2 | 7/2014 | Krueger et al. | |
| 8,782,792 B1 | 7/2014 | Bodke | |
| 8,789,172 B2 | 7/2014 | Stolfo et al. | |
| 8,789,178 B2 | 7/2014 | Kejriwal et al. | |
| 8,793,278 B2 | 7/2014 | Frazier et al. | |
| 8,793,787 B2 | 7/2014 | Ismael et al. | |
| 8,805,947 B1 | 8/2014 | Kuzkin et al. | |
| 8,806,647 B1 | 8/2014 | Daswani et al. | |
| 8,832,829 B2 | 9/2014 | Manni et al. | |
| 8,850,570 B1 | 9/2014 | Ramzan | |
| 8,850,571 B2 | 9/2014 | Staniford et al. | |
| 8,862,675 B1* | 10/2014 | Coomer | H04L 51/12 370/349 |
| 8,881,234 B2 | 11/2014 | Narasimhan et al. | |
| 8,881,271 B2 | 11/2014 | Butler, II | |
| 8,881,282 B1 | 11/2014 | Aziz et al. | |
| 8,898,788 B1 | 11/2014 | Aziz et al. | |
| 8,914,406 B1 | 12/2014 | Haugsnes et al. | |
| 8,935,779 B2 | 1/2015 | Manni et al. | |
| 8,949,257 B2 | 2/2015 | Shiffer et al. | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,021,043 B2 | 4/2015 | Andersen | |
| 9,027,135 B1 | 5/2015 | Aziz | |
| 9,071,535 B2 | 6/2015 | Chattopadhyay et al. | |
| 9,071,638 B1 | 6/2015 | Aziz et al. | |
| 9,104,867 B1 | 8/2015 | Thioux et al. | |
| 9,106,630 B2 | 8/2015 | Frazier et al. | |
| 9,106,694 B2 | 8/2015 | Aziz et al. | |
| 9,118,689 B1 | 8/2015 | Apte et al. | |
| 9,118,715 B2 | 8/2015 | Staniford et al. | |
| 9,159,035 B1 | 10/2015 | Ismael et al. | |
| 9,171,160 B2 | 10/2015 | Vincent et al. | |
| 9,176,843 B1 | 11/2015 | Ismael et al. | |
| 9,189,627 B1 | 11/2015 | Islam | |
| 9,195,829 B1 | 11/2015 | Goradia et al. | |
| 9,197,664 B1 | 11/2015 | Aziz et al. | |
| 9,210,156 B1 | 12/2015 | Little et al. | |
| 9,223,972 B1 | 12/2015 | Vincent et al. | |
| 9,223,980 B1 | 12/2015 | Bao | |
| 9,225,740 B1 | 12/2015 | Ismael et al. | |
| 9,241,010 B1 | 1/2016 | Bennett et al. | |
| 9,251,343 B1 | 2/2016 | Vincent et al. | |
| 9,262,635 B2 | 2/2016 | Paithane et al. | |
| 9,268,936 B2 | 2/2016 | Butler | |
| 9,275,229 B2 | 3/2016 | LeMasters | |
| 9,282,109 B1 | 3/2016 | Aziz et al. | |
| 9,292,686 B2 | 3/2016 | Ismael et al. | |
| 9,294,501 B2 | 3/2016 | Mesdaq et al. | |
| 9,300,686 B2 | 3/2016 | Pidathala et al. | |
| 9,306,960 B1 | 4/2016 | Aziz | |
| 9,306,974 B1 | 4/2016 | Aziz et al. | |
| 9,311,479 B1 | 4/2016 | Manni et al. | |
| 9,342,695 B2 | 5/2016 | Barkan | |
| 9,355,247 B1 | 5/2016 | Thioux et al. | |
| 9,356,944 B1 | 5/2016 | Aziz | |
| 9,363,280 B1 | 6/2016 | Rivlin et al. | |
| 9,367,681 B1 | 6/2016 | Ismael et al. | |
| 9,398,028 B1 | 7/2016 | Karandikar et al. | |
| 9,413,781 B2 | 8/2016 | Cunningham et al. | |
| 9,426,071 B1 | 8/2016 | Caldejon et al. | |
| 9,430,646 B1 | 8/2016 | Mushtaq et al. | |
| 9,432,389 B1 | 8/2016 | Khalid et al. | |
| 9,438,613 B1 | 9/2016 | Paithane et al. | |
| 9,438,622 B1 | 9/2016 | Staniford et al. | |
| 9,438,623 B1 | 9/2016 | Thioux et al. | |
| 9,459,901 B2 | 10/2016 | Jung et al. | |
| 9,467,460 B1 | 10/2016 | Otvagin et al. | |
| 9,483,644 B1 | 11/2016 | Paithane et al. | |
| 9,489,516 B1 | 11/2016 | Lu et al. | |
| 9,495,180 B2 | 11/2016 | Ismael | |
| 9,497,213 B2 | 11/2016 | Thompson et al. | |
| 9,507,935 B2 | 11/2016 | Ismael et al. | |
| 9,516,057 B2 | 12/2016 | Aziz | |

(56) References Cited

U.S. PATENT DOCUMENTS

| | | |
|---|---|---|
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shifter et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0024826 A1 | 2/2004 | Halahmi et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0049825 A1* | 3/2005 | King ............... G06F 11/0757 702/177 |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |

(56) References Cited

U.S. PATENT DOCUMENTS

| | | |
|---|---|---|
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0198247 A1* | 9/2005 | Perry .................. H04L 7/0008 709/223 |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0037079 A1 | 2/2006 | Midgley |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0149704 A1* | 7/2006 | Wyatt ............... G06F 17/30017 |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0265637 A1* | 11/2006 | Marriott ............ G06F 17/30867 715/210 |
| 2006/0271784 A1* | 11/2006 | Bolosky ............... G06Q 10/107 713/170 |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038703 A1 | 2/2007 | Tendjoukian et al. |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0083930 A1 | 4/2007 | Dumont et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0282848 A1* | 12/2007 | Kiilerich ........... G06F 17/30053 |
| 2008/0005782 A1 | 1/2008 | Aziz |
| 2008/0018122 A1 | 1/2008 | Zierler et al. |
| 2008/0022205 A1* | 1/2008 | Shinkai ............... G11B 27/034 715/723 |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0117816 A1* | 5/2008 | Stone ................ H04L 43/0817 370/230.1 |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0243878 A1* | 10/2008 | de Spiegeleer ..... G06F 11/1448 |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |

(56) References Cited

U.S. PATENT DOCUMENTS

| | | |
|---|---|---|
| 2009/0265692 A1 | 10/2009 | Godefroid et al. |
| 2009/0271867 A1 | 10/2009 | Zhang |
| 2009/0274384 A1* | 11/2009 | Jakobovits ............ G06F 19/321 |
| | | 382/254 |
| 2009/0287653 A1 | 11/2009 | Bennett |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115242 A1* | 5/2010 | Yamada ................ G06F 11/30 |
| | | 712/220 |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192152 A1 | 7/2010 | Miyamoto et al. |
| 2010/0192223 A1 | 7/2010 | Ismael et al. |
| 2010/0202236 A1* | 8/2010 | Kahler ................ G06F 11/1441 |
| | | 365/228 |
| 2010/0205279 A1* | 8/2010 | Takakura ................ H04L 67/16 |
| | | 709/219 |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0010697 A1* | 1/2011 | Golovkin ............ G06F 21/563 |
| | | 717/155 |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0125778 A1* | 5/2011 | Kubo ................ G06F 17/30516 |
| | | 707/769 |
| 2011/0128965 A1* | 6/2011 | Brehm ................ H04L 41/0893 |
| | | 370/401 |
| 2011/0131621 A1* | 6/2011 | Brehm ................ G06Q 30/0613 |
| | | 725/109 |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0153743 A1* | 6/2011 | Lindner ............ H04L 12/1822 |
| | | 709/204 |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0191341 A1 | 8/2011 | Meyer et al. |
| 2011/0219449 A1 | 9/2011 | St. Neitzel et al. |
| 2011/0219450 A1 | 9/2011 | McDougal et al. |
| 2011/0219451 A1* | 9/2011 | McDougal ............ G06F 21/562 |
| | | 726/23 |
| 2011/0225624 A1 | 9/2011 | Sawhney et al. |
| 2011/0225655 A1 | 9/2011 | Niemela et al. |
| 2011/0231901 A1* | 9/2011 | Nakamura ............ G06F 13/385 |
| | | 726/3 |
| 2011/0247072 A1 | 10/2011 | Staniford et al. |
| 2011/0265182 A1 | 10/2011 | Peinado et al. |
| 2011/0280240 A1* | 11/2011 | Yamagaki ............ H04L 1/1883 |
| | | 370/389 |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0321124 A1* | 12/2011 | Kisin ................ G06F 21/6218 |
| | | 726/2 |
| 2012/0023209 A1 | 1/2012 | Fletcher et al. |
| 2012/0023593 A1 | 1/2012 | Puder et al. |
| 2012/0054869 A1 | 3/2012 | Yen et al. |
| 2012/0063319 A1* | 3/2012 | Christin ................ H04L 45/00 |
| | | 370/235 |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0204144 A1* | 8/2012 | Fioritoni ............ H04L 67/02 |
| | | 717/120 |
| 2012/0210423 A1 | 8/2012 | Friedrichs et al. |
| 2012/0216244 A1 | 8/2012 | Kumar et al. |
| 2012/0221571 A1* | 8/2012 | Orman ................ G06F 17/3097 |
| | | 707/737 |
| 2012/0222121 A1 | 8/2012 | Staniford et al. |
| 2012/0246337 A1* | 9/2012 | Ross ................ H04L 45/308 |
| | | 709/238 |
| 2012/0252439 A1* | 10/2012 | Peterson ................ H04W 24/08 |
| | | 455/423 |
| 2012/0254321 A1 | 10/2012 | Lindsay et al. |
| 2012/0254917 A1* | 10/2012 | Burkitt ............ G06F 17/30817 |
| | | 725/40 |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0290584 A1* | 11/2012 | De Bona ................ G06F 8/60 |
| | | 707/741 |
| 2012/0297489 A1 | 11/2012 | Dequevy |
| 2012/0323131 A1* | 12/2012 | Ting ................ A61B 5/04012 |
| | | 600/521 |
| 2012/0330801 A1 | 12/2012 | McDougal et al. |
| 2012/0331553 A1 | 12/2012 | Aziz et al. |
| 2013/0007883 A1* | 1/2013 | Zaitsev ................ G06F 21/567 |
| | | 726/24 |
| 2013/0014259 A1 | 1/2013 | Gribble et al. |
| 2013/0036472 A1 | 2/2013 | Aziz |
| 2013/0047034 A1* | 2/2013 | Salomon ................ H04W 4/00 |
| | | 714/18 |
| 2013/0047257 A1 | 2/2013 | Aziz |
| 2013/0067023 A1 | 3/2013 | Joy et al. |
| 2013/0074185 A1* | 3/2013 | McDougal ............ G06F 21/561 |
| | | 726/24 |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |

(56) References Cited

U.S. PATENT DOCUMENTS

| | | | |
|---|---|---|---|
| 2013/0148158 A1* | 6/2013 | Kanakubo | G06F 3/1292 358/1.15 |
| 2013/0160125 A1 | 6/2013 | Likhachev et al. | |
| 2013/0160127 A1 | 6/2013 | Jeong et al. | |
| 2013/0160130 A1 | 6/2013 | Mendelev et al. | |
| 2013/0160131 A1 | 6/2013 | Madou et al. | |
| 2013/0167236 A1 | 6/2013 | Sick | |
| 2013/0174214 A1 | 7/2013 | Duncan | |
| 2013/0185789 A1 | 7/2013 | Hagiwara et al. | |
| 2013/0185795 A1 | 7/2013 | Winn et al. | |
| 2013/0185798 A1 | 7/2013 | Saunders et al. | |
| 2013/0191915 A1 | 7/2013 | Antonakakis et al. | |
| 2013/0196649 A1 | 8/2013 | Paddon et al. | |
| 2013/0223608 A1* | 8/2013 | Flockhart | H04M 3/5158 379/265.1 |
| 2013/0227691 A1 | 8/2013 | Aziz et al. | |
| 2013/0246370 A1 | 9/2013 | Bartram et al. | |
| 2013/0247186 A1 | 9/2013 | LeMasters | |
| 2013/0263122 A1* | 10/2013 | Levijarvi | G06F 11/1415 718/1 |
| 2013/0263260 A1 | 10/2013 | Mahaffey et al. | |
| 2013/0291109 A1 | 10/2013 | Staniford et al. | |
| 2013/0298192 A1 | 11/2013 | Kumar et al. | |
| 2013/0298243 A1 | 11/2013 | Kumar et al. | |
| 2013/0318038 A1 | 11/2013 | Shiffer et al. | |
| 2013/0318073 A1 | 11/2013 | Shiffer et al. | |
| 2013/0325791 A1 | 12/2013 | Shiffer et al. | |
| 2013/0325792 A1 | 12/2013 | Shiffer et al. | |
| 2013/0325871 A1 | 12/2013 | Shiffer et al. | |
| 2013/0325872 A1 | 12/2013 | Shiffer et al. | |
| 2013/0336285 A1* | 12/2013 | Edara | H04W 36/16 370/331 |
| 2013/0340080 A1 | 12/2013 | Gostev et al. | |
| 2013/0345887 A1* | 12/2013 | Govindan | G06F 9/4893 700/291 |
| 2014/0007236 A1 | 1/2014 | Krueger et al. | |
| 2014/0019962 A1 | 1/2014 | Litty et al. | |
| 2014/0032875 A1 | 1/2014 | Butler | |
| 2014/0053260 A1 | 2/2014 | Gupta et al. | |
| 2014/0053261 A1 | 2/2014 | Gupta et al. | |
| 2014/0122569 A1* | 5/2014 | Abel | H04L 67/2842 709/203 |
| 2014/0130158 A1 | 5/2014 | Wang et al. | |
| 2014/0137180 A1 | 5/2014 | Lukacs et al. | |
| 2014/0169762 A1 | 6/2014 | Ryu | |
| 2014/0179360 A1 | 6/2014 | Jackson et al. | |
| 2014/0181131 A1 | 6/2014 | Ross | |
| 2014/0189687 A1 | 7/2014 | Jung et al. | |
| 2014/0189866 A1 | 7/2014 | Shiffer et al. | |
| 2014/0189882 A1 | 7/2014 | Jung et al. | |
| 2014/0229221 A1* | 8/2014 | Shih | G06Q 10/06313 705/7.23 |
| 2014/0237600 A1 | 8/2014 | Silberman et al. | |
| 2014/0280245 A1 | 9/2014 | Wilson | |
| 2014/0281514 A1* | 9/2014 | Erofeev | G06F 21/6218 713/165 |
| 2014/0283037 A1 | 9/2014 | Sikorski et al. | |
| 2014/0283063 A1 | 9/2014 | Thompson et al. | |
| 2014/0310483 A1* | 10/2014 | Bennett | G06F 12/00 711/154 |
| 2014/0328204 A1 | 11/2014 | Klotsche et al. | |
| 2014/0330976 A1* | 11/2014 | van Bemmel | H04L 67/1023 709/226 |
| 2014/0337836 A1 | 11/2014 | Ismael | |
| 2014/0344926 A1 | 11/2014 | Cunningham et al. | |
| 2014/0351935 A1 | 11/2014 | Shao et al. | |
| 2014/0380473 A1 | 12/2014 | Bu et al. | |
| 2014/0380474 A1 | 12/2014 | Paithane et al. | |
| 2015/0007312 A1 | 1/2015 | Pidathala et al. | |
| 2015/0089252 A1* | 3/2015 | Chen | G06F 1/3206 713/300 |
| 2015/0095961 A1* | 4/2015 | Kliger | H04N 17/004 725/107 |
| 2015/0096022 A1 | 4/2015 | Vincent et al. | |
| 2015/0096023 A1 | 4/2015 | Mesdaq et al. | |
| 2015/0096024 A1 | 4/2015 | Haq et al. | |
| 2015/0096025 A1 | 4/2015 | Ismael | |
| 2015/0100617 A1* | 4/2015 | Diederich | H04L 67/1097 709/201 |
| 2015/0180764 A1* | 6/2015 | Pacella | H04L 47/125 709/242 |
| 2015/0180886 A1 | 6/2015 | Staniford et al. | |
| 2015/0181614 A1* | 6/2015 | Mitra | H04W 56/004 370/350 |
| 2015/0186645 A1 | 7/2015 | Aziz et al. | |
| 2015/0189005 A1 | 7/2015 | Dubois et al. | |
| 2015/0199513 A1 | 7/2015 | Ismael et al. | |
| 2015/0199531 A1 | 7/2015 | Ismael et al. | |
| 2015/0199532 A1 | 7/2015 | Ismael et al. | |
| 2015/0220735 A1 | 8/2015 | Paithane et al. | |
| 2015/0229656 A1 | 8/2015 | Shieh | |
| 2015/0236821 A1* | 8/2015 | Degraaf | H04L 1/08 714/748 |
| 2015/0278243 A1* | 10/2015 | Vincent | G06F 17/30194 707/634 |
| 2015/0319182 A1 | 11/2015 | Natarajan et al. | |
| 2015/0334511 A1 | 11/2015 | Rivera et al. | |
| 2015/0350134 A1 | 12/2015 | Yang et al. | |
| 2015/0370723 A1 | 12/2015 | Nambiar et al. | |
| 2015/0372980 A1 | 12/2015 | Eyada | |
| 2015/0373036 A1* | 12/2015 | Patne | H04L 63/1416 726/23 |
| 2015/0373043 A1 | 12/2015 | Wang et al. | |
| 2016/0004869 A1 | 1/2016 | Ismael et al. | |
| 2016/0006756 A1 | 1/2016 | Ismael et al. | |
| 2016/0044000 A1 | 2/2016 | Cunningham | |
| 2016/0044035 A1 | 2/2016 | Huang | |
| 2016/0070589 A1* | 3/2016 | Vermeulen | G06F 9/466 711/153 |
| 2016/0099963 A1 | 4/2016 | Mahaffey et al. | |
| 2016/0110544 A1 | 4/2016 | Singla | |
| 2016/0119379 A1 | 4/2016 | Nadkarni | |
| 2016/0127393 A1 | 5/2016 | Aziz et al. | |
| 2016/0191547 A1 | 6/2016 | Zafar et al. | |
| 2016/0191550 A1 | 6/2016 | Ismael et al. | |
| 2016/0197949 A1 | 7/2016 | Nyhuis et al. | |
| 2016/0212239 A1 | 7/2016 | Das et al. | |
| 2016/0217176 A1 | 7/2016 | Haviv et al. | |
| 2016/0261612 A1 | 9/2016 | Mesdaq et al. | |
| 2016/0269424 A1 | 9/2016 | Haugsnes | |
| 2016/0269437 A1 | 9/2016 | McDougal et al. | |
| 2016/0275303 A1 | 9/2016 | Narayanaswamy et al. | |
| 2016/0285914 A1 | 9/2016 | Singh et al. | |
| 2016/0294829 A1 | 10/2016 | Angus | |
| 2016/0301703 A1 | 10/2016 | Aziz | |
| 2016/0335110 A1 | 11/2016 | Paithane et al. | |
| 2017/0083703 A1 | 3/2017 | Abbasi et al. | |
| 2017/0085565 A1 | 3/2017 | Sheller et al. | |
| 2017/0093897 A1 | 3/2017 | Cochin et al. | |
| 2017/0164218 A1* | 6/2017 | Ni | H04W 48/18 |
| 2017/0180421 A1 | 6/2017 | Shieh et al. | |
| 2017/0250997 A1 | 8/2017 | Rostamabadi et al. | |
| 2017/0251013 A1 | 8/2017 | Kirti et al. | |
| 2017/0257767 A1 | 9/2017 | Zhao et al. | |
| 2018/0013770 A1 | 1/2018 | Ismael | |
| 2018/0027006 A1 | 1/2018 | Zimmermann et al. | |
| 2018/0048660 A1 | 2/2018 | Paithane et al. | |
| 2018/0121316 A1 | 5/2018 | Ismael et al. | |
| 2018/0144128 A1 | 5/2018 | Hakuta et al. | |
| 2018/0227627 A1 | 8/2018 | Jabara et al. | |
| 2018/0288077 A1 | 10/2018 | Siddiqui et al. | |
| 2018/0293111 A1* | 10/2018 | Chen | G06F 9/4881 |
| 2018/0295508 A1 | 10/2018 | Kyllonen | |
| 2018/0367560 A1 | 12/2018 | Mahaffey et al. | |
| 2019/0109849 A1 | 4/2019 | Frempong et al. | |

FOREIGN PATENT DOCUMENTS

| | | |
|---|---|---|
| GB | 2490431 A | 10/2012 |
| WO | 02/006928 A2 | 1/2002 |
| WO | 02/23805 A2 | 3/2002 |
| WO | 2007117636 A2 | 10/2007 |

(56) References Cited

FOREIGN PATENT DOCUMENTS

| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP .2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase © CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", Infocom, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.

(56) References Cited

OTHER PUBLICATIONS

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S. , et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham , "Insertion, Evasion, and Denial of Service: Eluding Network Intrusion Detection", Secure Networks, ("Ptacek"), (Jan. 1998).

U.S. Appl. No. 15/283,108, filed Sep. 30, 2016 Advisory Action dated Nov. 16, 2018.

U.S. Appl. No. 15/283,108, filed Sep. 30, 2016 Final Office Action dated Jul. 26, 2018.

U.S. Appl. No. 15/283,108, filed Sep. 30, 2016 Non-Final Office Action dated Feb. 23, 2018.

U.S. Appl. No. 15/283,108, filed Sep. 30, 2016 Non-Final Office Action dated Mar. 7, 2019.

U.S. Appl. No. 15/283,126, filed Sep. 30, 2016 Non-Final Office Actiong dated Sep. 7, 2018.

U.S. Appl. No. 15/283,126, filed Sep. 30, 2016 Notice of Allowance dated Mar. 4, 2019.

U.S. Appl. No. 15/283,128, filed Sep. 30, 2016 Non-Final Office Action dated Mar. 7, 2019.

U.S. Appl. No. 15/283,209, filed Sep. 30, 2016 Non-Final Office Action dated Feb. 8, 2019.

Venezia, Paul , "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

U.S. Appl. No. 15/283,128, filed Sep. 30, 2016 Final Office Action dated Jul. 12, 2019.

U.S. Appl. No. 15/283,209, filed Sep. 30, 2016 Final Office Action dated Aug. 15, 2019.

U.S. Appl. No. 15/283,108, filed Sep. 30, 2016 Final Office Action dated Oct. 31, 2019.

U.S. Appl. No. 15/283,209, filed Sep. 30, 2016 Notice of Allowance dated Nov. 15, 2019.

\* cited by examiner

TIMEOUT MANAGEMENT SERVICES

CROSS REFERENCE OF RELATED APPLICATIONS

This application claims the benefit of priority on U.S. Provisional Patent Application No. 62/402,961 filed Sep. 30, 2016, U.S. Provisional Patent Application No. 62/313,643, filed Mar. 25, 2016 and U.S. Provisional Patent Application No. 62/313,639 filed Mar. 25, 2016, the entire contents of all of which are incorporated by reference herein.

FIELD

Embodiments of the disclosure relate to the field of cybersecurity. More specifically, one embodiment of the disclosure relates to management of the analysis of objects under analysis within a scalable, threat detection architecture.

GENERAL BACKGROUND

Over the last decade, cybersecurity attacks have become a pervasive problem for internet users as many networked devices and other resources have been subjected to attack and compromised. The attack may involve the infiltration of malicious software onto a network device or concentration on an exploit residing within a network device to perpetrate the cybersecurity attack (generally referred to as "malware").

Recently, malware detection has undertaken three different approaches. One approach involves the installation of anti-virus software within network devices forming an enterprise network. Given that advanced malware is able to circumvent anti-virus analysis, this approach has been determined to be deficient.

Another approach involves the placement of dedicated malware detection appliances at various ingress points throughout a network or subnetwork. The malware detection appliances are configured to extract information propagating over the network at the ingress point, analyze the information to determine a level of suspiciousness, and conduct malware analysis internally within the appliance itself. While successful in detecting advanced malware that is attempting to infect network devices connected to the network (or subnetwork), as network traffic increases, this on-premises, appliance-based approach may exhibit resource constraints. Stated differently, the dedicated, malware detection appliance has a prescribed (and finite) amount of resources (for example, bandwidth and processing power) that, once fully in use, requires either the malware detection appliance to resort to more selective traffic inspection or additional (and/or upscaled) malware detection appliances to be installed. The later solution requires a large outlay of capital and network downtime, as IT resources are needed to install the new malware detection appliances. Also, these dedicated, malware detection appliances provide limited scalability and flexibility in deployment.

Yet another approach involves the use of exclusive, cloud-based malware detection appliances. However, this exclusive, cloud-based solution suffers from a number of disadvantages, including the inability of providing on-site deployment of resources at an enterprise's premises (e.g., as devices that are part of the enterprise's network infrastructure). On-site deployment may be crucial for compliance with requirements as to personally identifiable information (PII) and other sensitive information including those mandated at local, state, country or regional governmental levels.

Regardless of deployment of either an on-premises or cloud-based approach, the management of the timing for this analysis is important to ensure proper analysis operations, especially in light of an increase in network traffic and need.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 7:
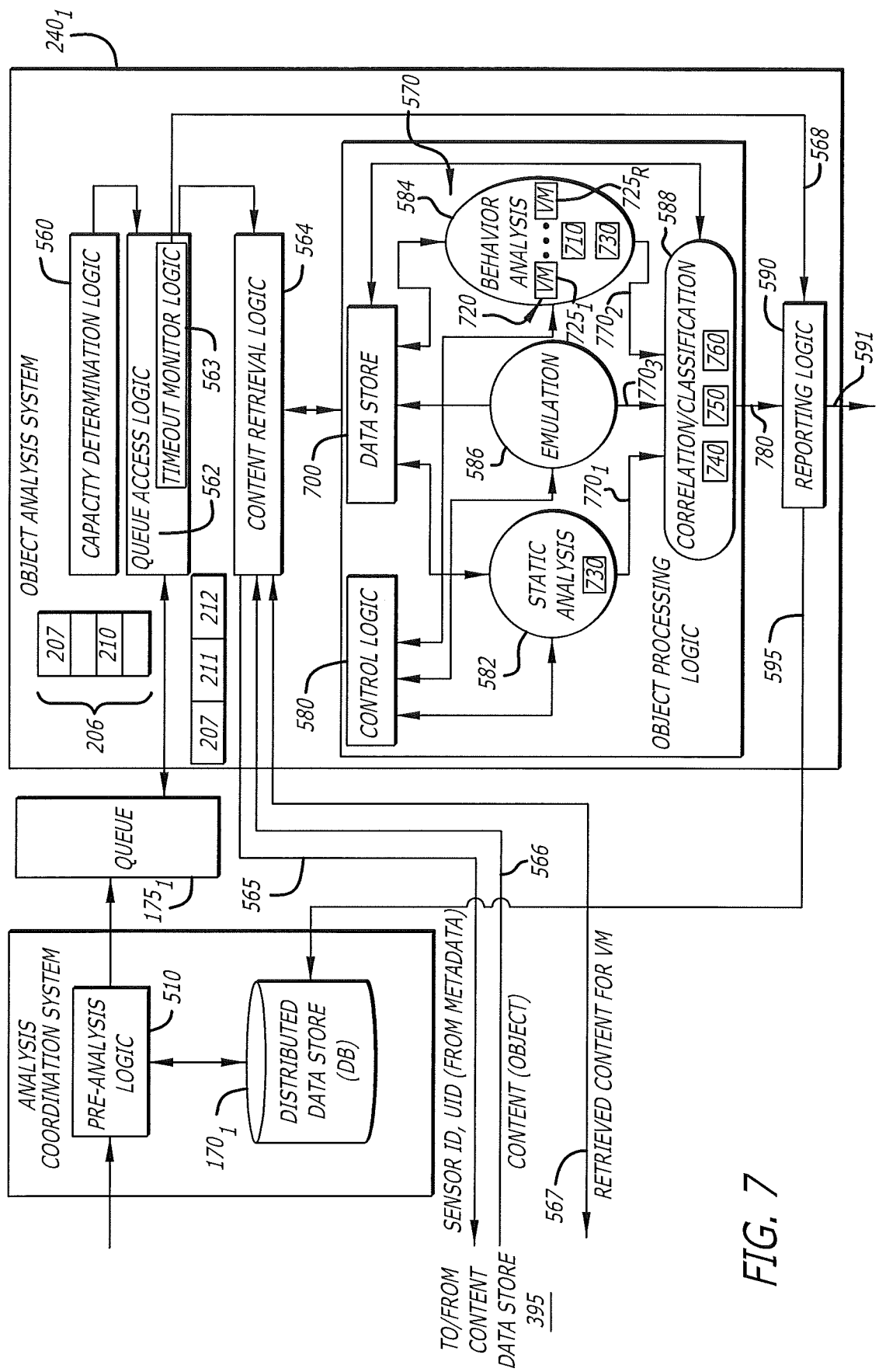
FIG. 7 is a flow diagram of operations conducted by an exemplary embodiment of logic implemented within the analysis coordination system of FIG. 5A and the object analysis system of FIG. 5B.
Figure 8:
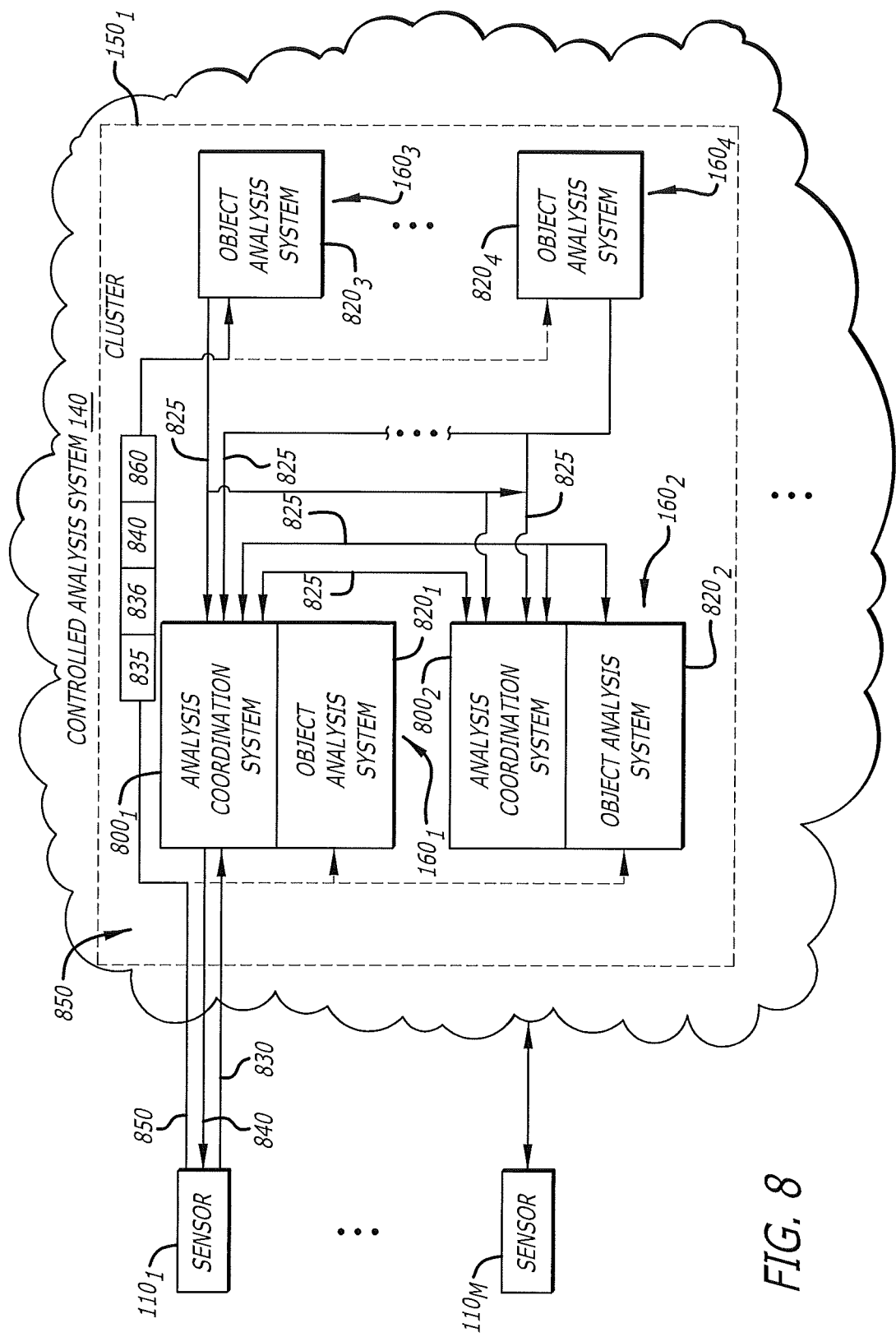
FIG. 8 is a second exemplary embodiment of logic implemented within a cluster operating as part of the centralized analysis system of FIG. 1.
Figure 9:
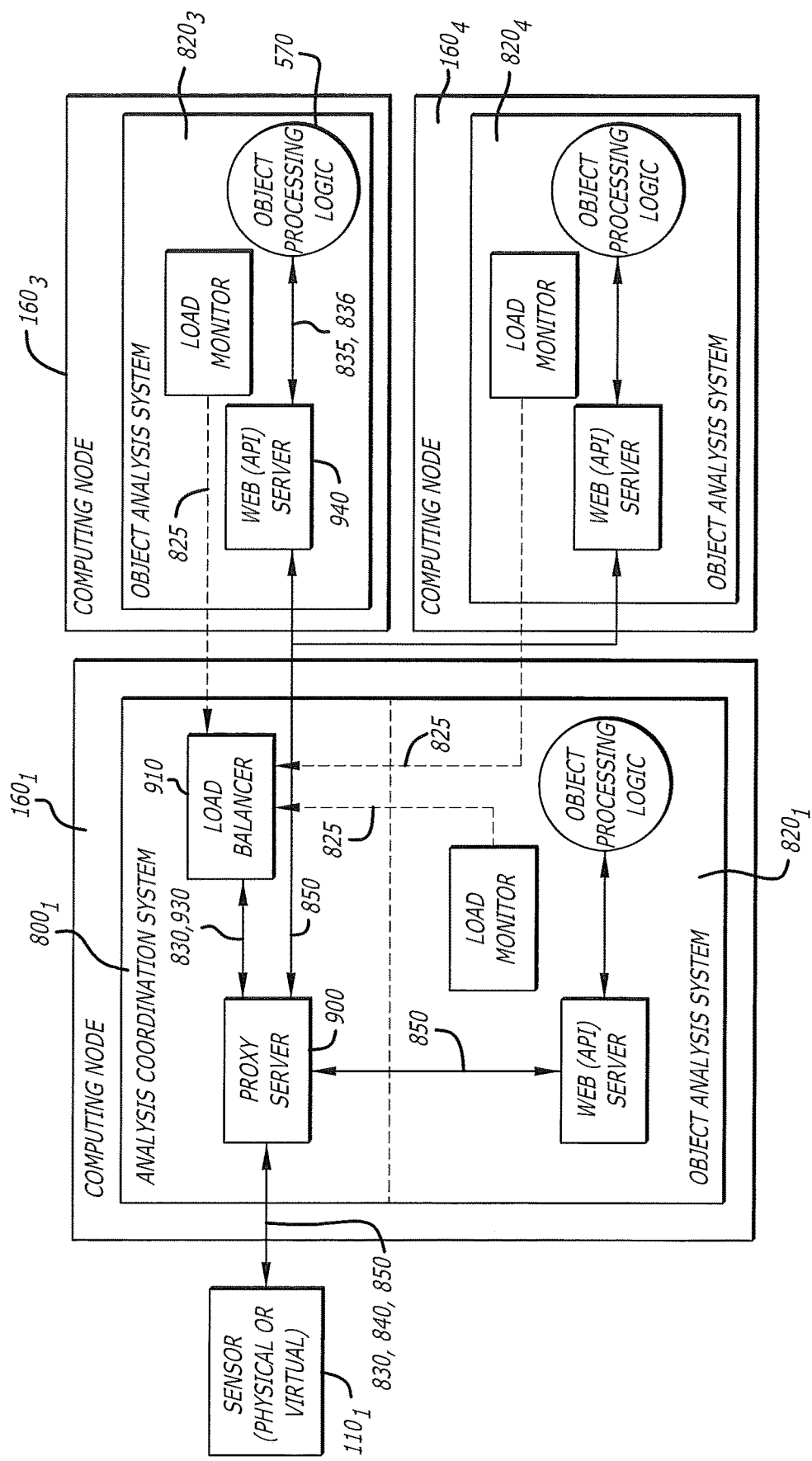
FIG. 9 is a block diagram of an exemplary embodiment of logic implemented within a computing node configured in accordance with the synchronous load balancing architecture.
Figure 10:
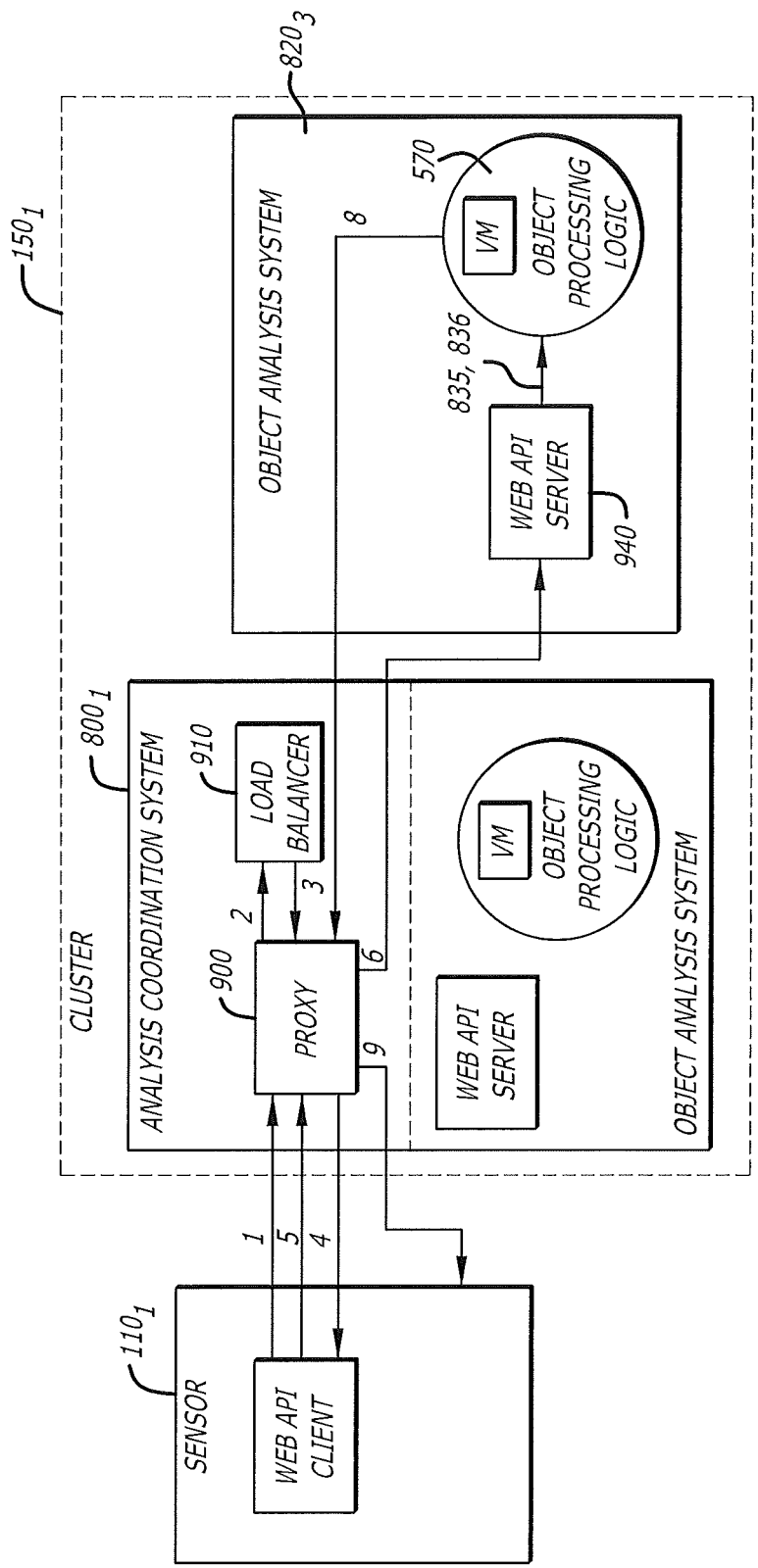
FIG. 10 is a block diagram of an operational flow between exemplary embodiments of a sensor, an analysis coordination system, and an object analysis system within a cluster of FIG. 1.

Embodiments of the present disclosure generally relate to a scalable, threat detection system that may be configured in accordance with either an asynchronous load balancing architecture (see FIGS. 2-7) or a synchronous load balancing architecture (see FIGS. 8-10). Each of these architectures includes one or more sensors that receive and conduct a preliminary analysis of objects within network traffic before providing such objects and their corresponding metadata to one or more clusters of computing nodes for analysis. The threat detection system may be procured (e.g., purchased) from a party such as a manufacturer, system integrator or cyber-security vendor, and deployed at an enterprise or other organization ("customer") to protect the customer's cyber-security infrastructure. Alternatively, the threat detection system may be used to provide cyber-security services over a network (cloud) on a subscription basis where customers obtain (e.g., purchase) access to the services (and thus to the often geographically remotely located threat detection system) to protect their private cyber-security infrastructure without the capital outlay involved in purchasing the threat detection system outright. The subscription based services vendor often provides the services on a co-tenancy or multi-tenancy basis for increased resource (asset) utilization and cost efficiencies.

The scalable, threat detection system features a plurality of timeout management units deployed in one or more sensors and/or clusters forming the threat detection system. The timeout management units are arranged to detect timeout events. In general, a "timeout event" is a detected occurrence of an object that has not been timely submitted by a sensor or processed by a cluster before expiration of a prescribed period of time. Timeout events detect analysis latency at different locations within the threat detection system where the analysis latency may be based, at least in part, on resource availability or workload limits, for example, in a subscription based deployment, corresponding to the subscription level established for the sensor.

For instance, in a subscription based deployment, one embodiment of the threat detection system may include a first timeout monitoring unit implemented to monitor for timeout events that may signify the sensor is operating in an overloaded state, namely a state that signifies the sensor is unable to conduct preliminary analysis of incoming information and timeout events are occurring due to a failure by the sensor to timely upload data submissions including objects for analysis. Hence, a subscription level assigned to the sensor fails to provide a level of analysis that is needed, and thus, a higher tier subscription level may need to be procured to handle the current amount of data traffic for analysis. The first timeout monitoring unit also may be used to further detect that the cluster assigned to the sensor is operating in an overloaded state (e.g., timeout events are occurring due to a failure to timely conduct a malware analysis of objects submitted to the cluster by the sensor). Similarly, a higher tier subscription level by the sensor may be needed to prioritize sensor-cluster assignment through sensor re-enrollment system along with message (warnings) being sent to administrators of the cluster regarding the operability of the cluster and suggested cluster size increases or modifications. The threat detection system may also feature cluster-based timeout monitoring units that are implemented to monitor for timeout events that may further signify an overloaded state being experienced by the cluster or even a particular computing node within the cluster, as described below.

As described below, a sensor-based timeout monitoring unit and one or more cluster-based timeout monitoring units are configured to monitor events caused by analysis latency, which may be used to monitor resource availability or workload limits. These timeout monitoring units may further be used in a subscription based deployment for adjusting or suggesting adjustments in the subscription level enrolled by the sensor or in an on-premises deployment procurement of additional analytical capacity, e.g., purchase of one or more additional clusters.

Each sensor may be implemented with a first timeout monitoring unit that is configured to monitor analysis latency by detecting timeout events that denotes a failure to complete analysis of an object for malware within a prescribed period of time. In a periodic or aperiodic manner, the sensor is configured to report information associated with the timeout events encountered to a management system, which may be located on premises at a customer (sometimes referred to as an "on-premises management system") or remotely located from the customer (sometimes referred to as a "cloud-based management system").

As an illustrative example, upon detecting that an aggregate of timeout events for an individual sensor meets or exceeds a threshold (in terms of number or frequency of occurrence over a prescribed time period), the management system may identify the sensor is operating in an overloaded state, send a message to a network administrator (or owner), e.g., in a subscription based deployment to suggest a change of subscription level to service a customer's increasing needs or in an on-premises deployment procurement of an additional compute node or cluster. Alternatively, the management system may issue a signal for the sensor to commence a re-enrollment process. The re-enrollment process is performed so that the sensor may evaluate its cluster pairing, especially when the particular cluster to which it is presently enrolled may be overloaded and is not providing a desired level of malware analysis and protection. The re-enrollment process may take into account the workloads on each of the clusters and/or computing nodes available to support the customer (e.g., based on geography, type of object, etc.). Where additional clusters are available, the re-enrollment process may be conducted as described in U.S. patent application Ser. No. 15/283,209 filed Sep. 30, 2016, the contents of which are incorporated by reference. Where additional clusters are not available in an on-premises deployment, additional computing nodes may need to be purchased and/or clusters may need to be formed or re-configured by the customer, where the purchase may be prompted in response to the management system or one or more of the sensors issuing appropriate messages to a network administrator along with information to support the purchase and/or configuration. In subscription based deployments, the customer may need to procure a higher tier subscription level that accommodates its increased needs.

As another illustrative example, an on-premises management system may be configured to determine statistics, based on an aggregate of all analytic data associated with timeout events for managed sensors within the threat detection system. The statistics may convey that certain computing nodes of a centralized analysis system within the threat detection system lack capacity to properly service the managed sensors. As a result, the management system may send a message to a pre-established entity (e.g., an enterprise or cluster administrator, cluster installer, computing node manufacturer, etc.) that identifies the lack of capacity and signals a need for increased processing capacity through the purchase of one or more additional computing nodes, the replacement of one or more existing computing nodes, or the formation of one or more additional clusters to service the number of sensors and type of traffic at the customer's premises. Alternatively, in subscription based deployments, the message may indicate the need for a higher tier subscription.

Similarly, a cloud-based management system may send a message that suggests, to the pre-established entity, a change of subscription level to service a customer's increasing needs. It is contemplated that the management system may aggregate analytic data provided by different network devices, including on-premises management systems for example, may produce statistics that support the change of subscription level, as described above. The statistics may include the number and/or frequency of timeout events, metadata on the type of objects under analysis, detected levels of suspiciousness for objects being analyzed, and/or estimated performance increases on a sensor, multi-sensor, or cluster basis based on the change of subscription level. The statistics may be based on a per sensor basis, across sensors (in the aggregate) supported at the customer's premises, or a per cluster basis.

Besides sensor timeout monitoring, each cluster that is part of the threat detection system is implemented with one or more cluster-based timeout monitoring units (sometimes referred to as "timeout monitoring unit(s)"). The cluster-based timeout monitoring unit(s) are used, at least in part, to monitor cluster or computing node workload and/or for queue and/or data store management since entries of the queue and/or object data store can be flushed when the timeout occurs (e.g., removal of metadata for a particular individual object in the queue or metadata for a corresponding object in the object data store). Therefore, the cluster may be configured to report the aggregate of timeout events (e.g., frequency or number over a prescribed duration of time) detected by the timeout monitoring logic within the cluster itself to an on-premises management system or in a remote (cloud-based) management system.

For on-premises deployments of a management system when the aggregate of cluster timeout events (in terms of number or frequency over a prescribed period) meets or exceeds a threshold, the management system may issue a message to the pre-established entity that the customer requires an increase in capacity through purchase of one or more additional computing nodes or clusters to service the number of sensors and type of traffic now detected at the customer's premises. However, for subscription based deployments of the management system, when the aggregate of cluster timeout events meets or exceeds a threshold, the management system can send a message to a cluster provider that capacity limits may have been reached across many customers serviced by a cluster or multiple clusters. Again, the statistics based on analytic data collected by the management system may include the number and/or frequency of timeout events per node/cluster, metadata on the type of objects under analysis, geography of the cluster, or the like. The statistics may be based on a per computing node basis or across clusters (in the aggregate) managed by the management system.

I. Terminology

In the following description, certain terminology is used to describe features of the invention. In certain situations, terms "logic," "unit," "subsystem," "engine" and "component" are representative of hardware, firmware and/or software that is configured to perform one or more functions. As hardware, logic (or unit or subsystem or engine or component) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or unit or subsystem or engine or component) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "computerized" generally represents that any corresponding operations are conducted by hardware in combination with software and/or firmware.

The term "message" generally refers to information in a prescribed format and transmitted in accordance with a suitable delivery protocol such as Hypertext Transfer Protocol (HTTP), HTTP Secure (HTTPS); Simple Mail Transfer Protocol (SMTP), iMESSAGE, Post Office Protocol (POP), Instant Message Access Protocol (IMAP), or the like. Hence, each message may be in the form of one or more packets, frames, or any other series of bits having the prescribed format. Messages may correspond to HTTP data transmissions, email messages, text messages, or the like.

According to one embodiment, the term "malware" may be construed broadly as any code or activity that is part of a malicious attack or any operations associated with anomalous or unwanted behavior. For instance, malware may correspond to a type of malicious computer code that executes an exploit to take advantage of a vulnerability or may otherwise harm or co-opt operation of a network device or misappropriate, modify or delete data. Malware may also correspond to an exploit, namely information (e.g., executable code, data, command(s), etc.) introduced into a network device connected to a network by a person who gained unauthorized access to that network device. The introduction of the information may result in the network device or another network device experiencing or causing unwanted or anomalous behaviors. The undesirable or anomalous behaviors may include a communication-based anomaly or an execution-based anomaly, which, for example, could (1) alter the functionality of a network device executing application software in an atypical manner (e.g., a file is opened by a first process where the file is configured to be opened by a second process and not the first process); (2) alter the functionality of the network device executing that application software without any malicious intent; and/or (3) provide unwanted functionality which may be generally acceptable in another context (e.g., uploading contact list to cloud storage without permissions set by the user).

In certain instances, the terms "compare," "comparing," "comparison" or other tenses thereof generally mean determining if a match (e.g., a certain level of correlation) is achieved between two items where one of the items may include a particular pattern.

The term "network device" should be construed as any electronic device with the capability of processing or storing data and connecting to a network. Such a network may be a public network such as the Internet or a private network such as a wireless data telecommunication network, wide area network, a type of local area network (LAN), or a combination of networks. Examples of a network device may include, but are not limited or restricted to a laptop, a mobile phone, a tablet, a computer, standalone appliance, a router or other intermediary communication device, resources with data storage, etc. Other examples of a network device includes a sensor as well as a computing node. A "sensor" includes hardware and/or software that operates as a network device to receive information over a network and perform a preliminary analysis on the information to determine whether further malware analysis is needed. A "computing node" includes hardware and/or software that operates as a network device to receive information from a sensor, and when applicable, perform the malware analysis on that information.

The term "transmission medium" may be construed as a physical or logical communication path between two or more network devices (e.g., any devices with data processing and network connectivity such as, for example, a sensor, a computing node, mainframe, a computer such as a desktop or laptop, netbook, tablet, firewall, smart phone, router, switch, bridge, etc.) or between components within a network device. For instance, as a physical communication path, wired and/or wireless interconnects in the form of electrical wiring, optical fiber, cable, bus trace, or a wireless channel using infrared, radio frequency (RF), may be used.

The term "data submission" is a collection of data including an object along with metadata associated with that object. An object generally relates a collection of data, whether in transit (e.g., over a network) or at rest (e.g., stored), often having a logical structure or organization that enables it to be classified for purposes of analysis for malware. Examples of different types of objects may include a data element or related packets that are received, transmitted, or exchanged within a communication session, which may include a data element.

Herein, a "data element" generally refers to as a plurality of packets carrying related payloads, e.g., a single webpage received over a network. The data element may be an executable (e.g., an application, program, segment of code, dynamic link library "dll", etc.) or a non-executable. Examples of a non-executable may include a document (e.g., a Portable Document Format "PDF" document, a word processing document such as a Microsoft® Office® document, etc.), an electronic mail (email), downloaded web page, a file retrieved from a storage location over an interconnect, or the like.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Scalable Threat Detection System

Figure 1:
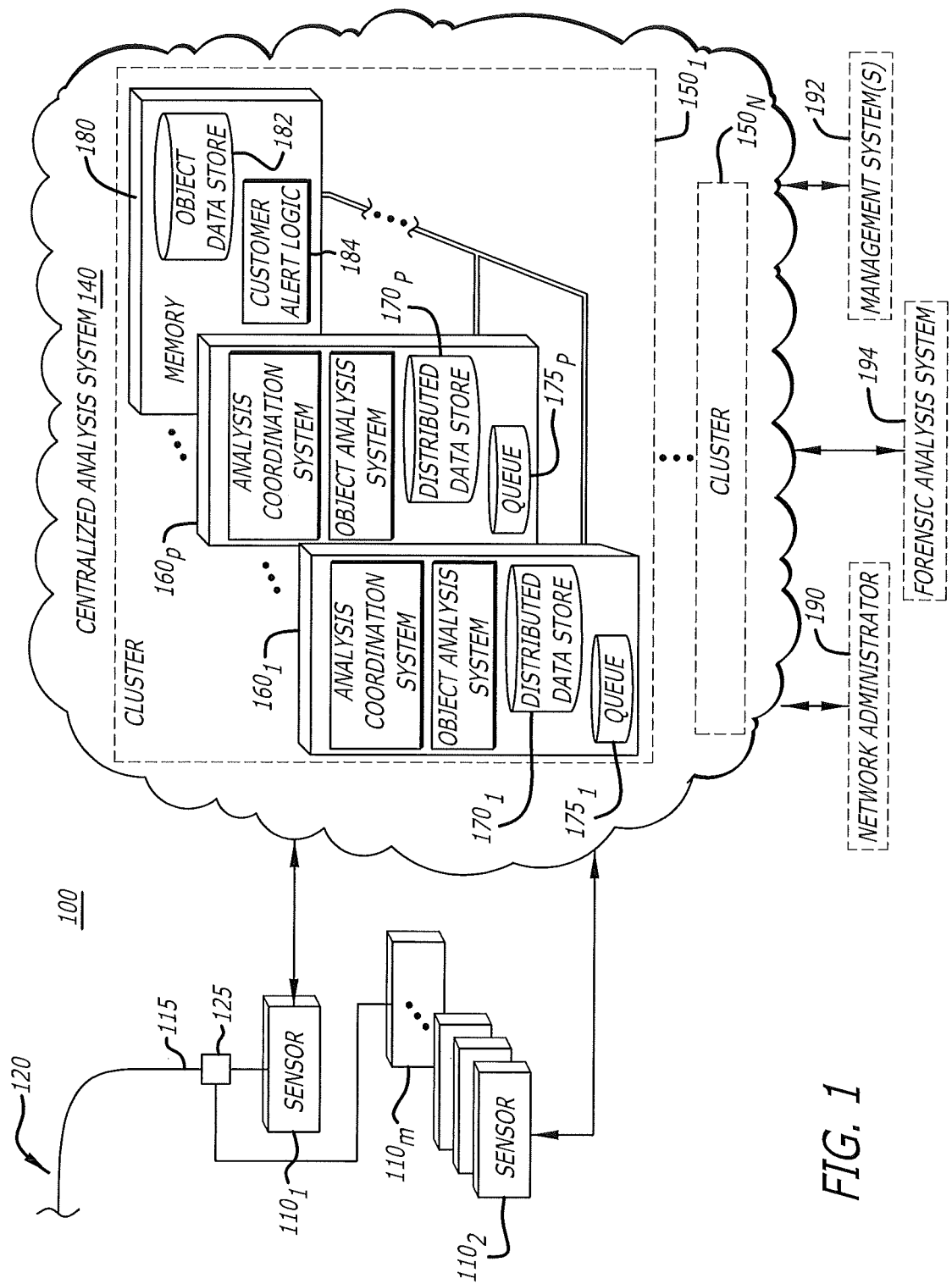
FIG. 1 is a block diagram of an exemplary embodiment of a threat detection system.

Referring to FIG. 1, an exemplary block diagram of a threat detection system 100 is shown. The threat detection system 100 comprises one or more sensors $110_1$-$110_M$ (M≥1) communicatively coupled to a centralized analysis system 140. Some or all of the centralized analysis system 140 may be located at an enterprise's premises (e.g., located as any part of the enterprise's network infrastructure whether located at a single facility utilized by the enterprise or at a plurality of facilities). As an alternative embodiment, some or all of the centralized analysis system 140 may be located outside the enterprise's network infrastructure, generally referred to as public or private cloud-based services that may be hosted by a cybersecurity provider or another entity separate from the enterprise (service customer). Obtaining a high degree of deployment flexibility, embodiments can also provide "hybrid" solutions, where the threat detection system 100 can include some of the centralized analysis system 140 located on premises and some as a cloud-based service (often located remotely, e.g., "off premises"). This provides optimal scaling with controlled capital expense as well as the ability to control location(s) of deployments to satisfy local requirements, e.g., as to sensitive information.

As shown in FIG. 1, the sensors $110_1$-$110_M$ may be positioned at various locations on a transmission medium 115 that is part of the network 120 (e.g., connected at various ingress points on a wired network or positioned at various locations for receipt of wireless transmissions) and monitor data propagating over the transmission medium 115. This data may include an electrical transmission of files, email messages, or the like.

More specifically, according to one embodiment of the disclosure, the sensor $110_1$ may be implemented as a network device that is coupled to the transmission medium 115 directly or is communicatively coupled with the transmission medium 115 via an interface 125 operating as a data capturing device. According to this embodiment, the interface 125 is configured to receive the incoming data and subsequently process the incoming data, as described below. For instance, the interface 125 may operate as a network tap in some embodiments with mirroring capability) that provides at least one or more data submissions (or copies thereof) extracted from data traffic propagating over the transmission medium 115. Alternatively, although not shown, the sensor $110_1$ may be configured to receive files or other objects automatically (or on command), accessed from a storage system. As yet another alternative, the sensor $110_1$ may be configured to receive information that is not provided over the network 120. For instance, as an illustrative example, the interface 125 may operate as a data capturing device (e.g., port) for receiving data submissions manually provided via a suitable dedicated communication link or from portable storage media such as a flash drive.

As further shown in FIG. 1, one sensor $110_1$ may be deployed individually or multiple sensors $110_1$-$110_M$ may be positioned in close proximity, perhaps sharing the same power source (e.g., common bus plane as described below) or a centralized timeout monitoring logic (not shown). The sensors $110_1$-$110_M$ are configured to receive intercepted or copied data propagating over the transmission medium 115 and conduct an analysis on one or more packets within the data traffic to determine whether any packet or a set of related packets (flow or multi-flow) is suspicious. Such analysis may involve a determination as to whether any packets are sourced by or directed to a particular network device in a "blacklist" or a determination as to whether the body of the packet includes a certain data pattern. In the event that one or more of the packets are determined as suspicious, the monitoring sensor uploads a data submission, including metadata and an object for analysis, to the centralized analysis system 140.

Figure 2:
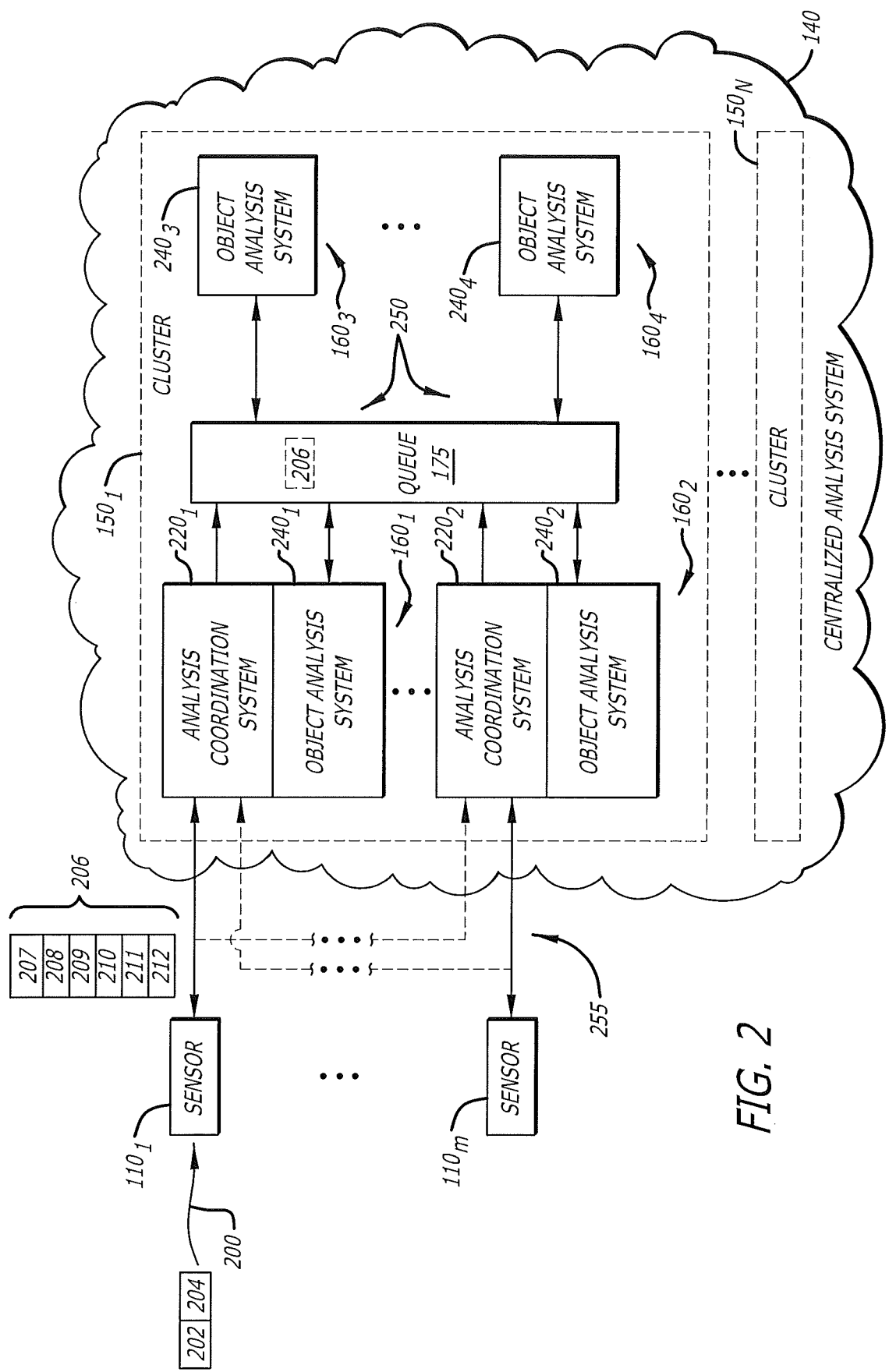
FIG. 2 is a first exemplary embodiment of logic implemented within a cluster operating as part of the centralized analysis system of FIG. 1.
Figure 3:
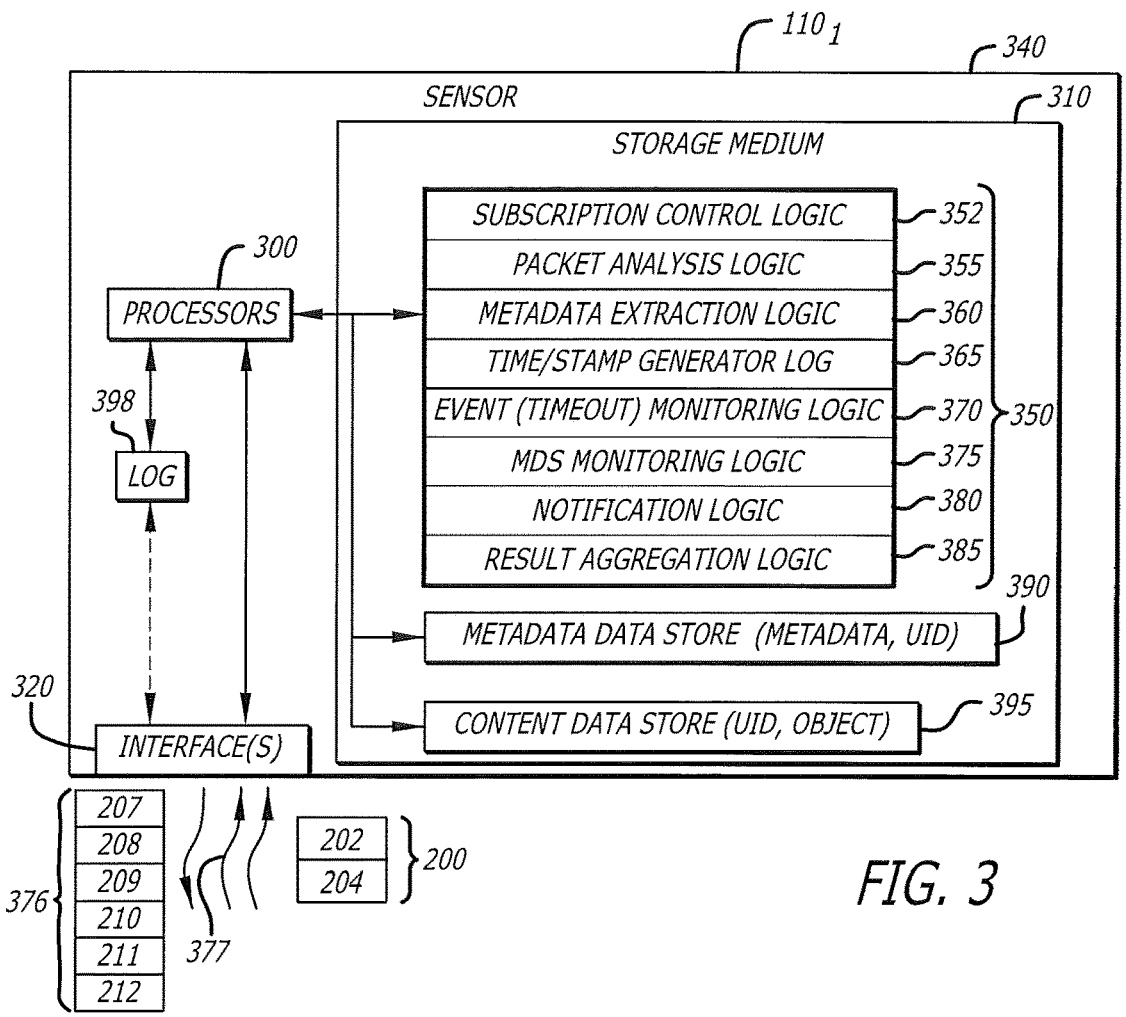
FIG. 3 is a block diagram of an exemplary embodiment of logic implemented within a sensor deployed within the threat detection system of FIG. 1.

As shown in FIG. 3 and described below, the sensor $110_1$ may include a timeout monitoring unit (logic) 370 that is configured to monitor analysis latency by detecting timeout events, namely an expiration of a prescribed period of time (e.g., the timeout value, as described below) allocated for analysis of an object. The prescribed period of time is directed to a period of time for analysis on a per-object basis and, upon expiration of the period of time, the analysis is deemed complete regardless of whether analysis results have been finished or not. If the analysis is not complete (or the analysis results are not made available, depending on which mechanism is involved) for a particular object when the prescribed period of time has expired, a timeout event has occurred for the object. The prescribed time period has a duration that may be fixed or user configurable, but can also depend on the type of object, prevailing threat level, or subscription level. The timeout period can be dynamic as well (set by the system itself) depending on various factors such as system load (throughput), resource availability, suspicious traffic quantity/conditions, and/or queue length. This timeout period applies to both the sensor timeout monitoring logic 370 of FIG. 2 and the computing node's timeout monitor logic 563.

The sensor $110_1$ is configured to report information associated with an aggregate of (one or more) timeout events, as detected by the timeout monitoring logic 370, to a management system 192 and/or an optional customer alert logic 184 of FIG. 1. The reported information may include, but is not limited or restricted to, some or all of the aggregated metadata (described below). The aggregated metadata may include (i) a sensor identifier (ID); (ii) a timestamp that denotes, for example, the time of receipt or start of analysis of the suspicious object or time of detection of suspiciousness; (iii) a timeout value that denotes an amount of time allocated by the sensor $110_1$ to complete the malware analysis of the object; (iv) representative content of the suspicious object (e.g., hash value, checksum, etc.), and/or (v) an identifier of the object under analysis.

Herein, the management system 192 may be located on premises at a customer (on-premises management system) or remotely located (cloud-based management system). Although not shown, it is contemplated that the sensor $110_1$ may be implemented entirely as software for uploading into a network device and operating in cooperation with an operating system running on the network device. For this implementation, the software-based sensor is configured to operate in a manner that is substantially similar or identical to a sensor implemented as a network device. Hence, the logic for the software-based sensor corresponds to software modules that, when executed by a processor, perform functions similarly to the functions performed by logic that is part of the sensor implemented as a network device.

The centralized analysis system 140 features one or more clusters of computing nodes $150_1$-$150_N$ (N≥1), where these computing nodes are grouped in order to conduct collective operations for a set of sensors (e.g., sensors $110_1$-$110_M$). Each cluster $150_1$-$150_N$ may include computing nodes equipped for behavioral monitoring while executing (running) objects within one or more virtual machines (VMs). The virtual machines may have different guest image bundles that include a plurality of software profiles each with a different type of operating system (OS), application program, or both. Alternatively, each cluster $150_1$-$150_N$ may include computing nodes having identical guest image bundles that include software profiles directed to the same operating system (e.g., Windows® OS cluster, MAC® OS X cluster, etc.). Additionally, the cluster $150_1$-$150_N$ may be located to communicate with sensors within the same state, Provence, region or country to ensure compliance with governmental regulations.

As shown, for illustrative purposes, a cluster $150_1$ may include a plurality of computing nodes $160_1$-$160_P$ (P≥1). The plurality of computing nodes $160_1$-$160_P$ may be arranged in a "blade server" type deployment, which allows additional computing nodes to be seamlessly added to or removed from the cluster $150_1$ (e.g., computing nodes $160_1$-$160_P$ being connected to a common bus plane that may provide both power and signaling between the computing nodes, a hot-swapping deployment of the computing nodes faulting the cluster $150_1$, or any other deployment that allows a scalable computing node architecture).

Additionally according to this embodiment of the disclosure, each of the clusters $150_1$-$150_N$ (e.g., cluster $150_1$) is communicatively coupled to a distributed data store 170 and a distributed queue 175. The distributed data store 170 and the distributed queue 175 may be provided through a separate memory node 180, which is communicatively coupled to and accessed by computing nodes $160_1$-$160_P$. For this embodiment, a data store 182 for storage of the malicious objects (hereinafter "object data store") may be provided in memory node 180. Alternatively, as shown, it is contemplated that the distributed data store 170 and the distributed queue 175 may be provided as a collection of synchronized memories within the computing nodes $160_1$-$160_P$ (e.g., synchronized data stores $170_1$-$170_P$ that collectively form the distributed data store 170; synchronized queues $175_1$-$175_P$ that collectively form the distributed queue 175 where each of the queues $175_1$-$175_P$ is synchronized to store the same information) each accessible by the computing nodes $160_1$-$160_P$ respectively. The distributed data store 170 (formed by local data stores $170_1$-$170_P$ operating in accordance with a selected memory coherence protocol) are accessible by the computing nodes $160_1$-$160_P$, and thus, data stores $170_1$-$170_P$ may be configured to store the same information. Alternatively, the data stores $170_1$-$170_P$ may be configured to store different information, provided the collective information is available to all of the computing nodes $160_1$-$160_P$ in the same cluster $150_1$.

In order to provide sufficient processing capabilities to the sensors $110_1$-$110_N$ deployed throughout the network 120, the centralized analysis system 140 is scalable by allowing a flexible clustering scheme for computing nodes as well as allowing for the number of clusters to be increased or decreased in accordance with system processing capability. Stated differently, one or more computing nodes (e.g., computing node $160_{P+1}$) may be added to the cluster $150_1$ based on an increase in the current workload of the threat detection system 100. Likewise, one or more computing nodes (e.g., computing node $160_P$) may be removed from the cluster $150_1$, now forming computing nodes $160_1$-$160_{P-1}$, based on a decrease in the current workload.

As an optional feature, one or more of the clusters $150_1$-$150_N$ may be configured with reporting logic to provide alerts to a customer such as a network administrator 190 of the customer for example, that identify degradation of the operability of that cluster. For example, this reporting logic (illustrated in FIG. 1 as "customer alert logic 184") may be configured to operate with the timeout monitoring logic 530 and/or timeout monitor logic 563 of FIGS. 5A-5B to monitor metadata within at least one of the queue $175_1$ (when the contents of each queue $175_1$-$175_P$ are identical) for metadata approaching a timeout event (e.g., where the amount of time that the metadata has been retained in the queue $175_1$, sometimes referred to as "metadata queuing time," exceeds a timeout value within the metadata where the timeout value identifies the amount of time remaining to conduct a malware analysis on the object corresponding to the metadata). Herein, a prescribed time threshold is set for the cluster $150_1$, where the threshold may be a fixed time, a variable time that is based on cluster size or other factors, or set based on customer preferences. Accordingly, if a number of metadata entries fall within a selected threshold from the timeout event (e.g. within a number of minutes, hours, etc.), the customer alert logic 184 transmits an alert signal that propagates to the customer and reports a potential degradation in performance. The alert signal identifies to the customer that procurement of additional computing nodes may be warranted to reduce overall workload of the computing nodes that form the cluster $150_1$.

As another example, if a number or frequency of detected timeout events at a computing node (e.g., computing node $160_1$) exceeds a threshold, the customer alert logic 184 may issue (directly or via the sensor $110_1$ a message to a pre-established entity (e.g., customer administrator, network administrator, cluster provider or installer, etc.) that identifies the lack of capacity and signals a need for increased processing capacity. The increase processing capacity may be attained in on premises deployments through (i) the purchase of one or more additional computing nodes $160_2$ . . . and/or $160_P$, (ii) the replacement of one or more existing computing nodes, or (iii) the formation of one or more additional clusters to service the number of sensors and type of traffic at the customer's premises. The increase processing capacity may be attained in subscription based deployments through an increase in subscription levels. Alternatively, if the number or frequency of detected timeout events at computing node $160_1$ exceeds a threshold, the computing node $160_1$ may provide the information associated with the detected timeout events (e.g., time of occurrence, identifier of the computing node, sensor identifier that provided the object to which the timeout event pertains, etc.) to the management system 192 for subsequent forwarding to the pre-established entity.

As further shown, clusters $150_1$-$150_N$ may be configured to provide at least a portion of the malware analysis results for an object to a management system 192 that monitors the health and operability of the network 120. Additionally, the object and/or analysis results from any of the clusters $150_1$-$150_N$ may be provided to a forensic analysis system 194 for further detailed analysis as to confirm that the object is associated with malware and the nature of the malware. Although not shown, the clusters $150_1$-$150_N$ may be communicatively coupled to remotely located services to receive threat signatures that identify uncovered malware (or information to formulate threat signatures) from the clusters $150_1$-$150_N$ and proliferate these signatures throughout the threat detection system 100.

A. Asynchronous Load Balancing Architecture

Referring now to FIG. 2, a first exemplary embodiment of logic implemented within the cluster $150_1$ that is operating as part of the centralized analysis system 140 of FIG. 1 is shown. The cluster $150_1$ comprises a plurality of computing nodes $160_1$-$160_P$, which are communicatively coupled to the distributed queue 175 (logical representation of the collective memory of queues $175_1$-$175_P$) over a first network 250. Each computing node (e.g., computing node $160_1$) comprises an analysis coordination system $220_1$ and an object analysis system $240_1$. The analysis coordination system $220_1$ may be activated or deactivated, where the computing node $160_1$ operates as a "broker" computing node when the analysis coordination system $220_1$ is activated or operates as an "analytic" computing node when the analysis coordination system $220_1$ is deactivated. As an alternative embodiment, it is contemplated that a "broker" computing node may have a logical architecture different than an "analytic" computing node. For example, a broker computing node may be configured with only an analysis coordination system. An analytic computing node may be configured with only an object analysis system.

According to this illustrative embodiment, sensors $110_1$-$110_M$ are communicatively coupled over a second network 255, which is different than the first network 250, to the first cluster $150_1$ via the broker computing nodes (e.g., computing node $160_1$ and computing node $160_P$). Each analysis coordination system $220_1$ and $220_2$ is configured to receive metadata from the sensors $110_1$-$110_M$, and based on the metadata, fetch corresponding objects for analysis. As an alternative, each analysis coordination system $220_1$ and $220_2$ may be configured to receive the metadata and object from the sensors $110_1$-$110_M$.

More specifically, as shown, the threat detection system 100 features one or more sensors $110_1$-$110_M$, each sensor $110_1$-$110_M$ is configured to receive information that includes at least metadata 202 and a corresponding object 204. Upon receipt of the information 200, a sensor (e.g., sensor $110_1$) separates the metadata 202 from the object 204 and conducts a preliminary analysis to determine whether the object 204 is suspicious (e.g., meets a first prescribed level of likelihood that the object is associated with malware). The preliminary analysis may include one or more checks (real-time analyses) being conducted on the metadata 202 and/or object 204 without execution of the object 204. Examples of the checks may include bit pattern comparisons of content forming the metadata 202 or object 204 with pre-stored bit patterns to uncover (i) deviations in messaging practices (e.g., non-compliance in communication protocols, message formats or ordering, and/or payload parameters including size); (ii) presence of content within the object that is highly susceptible to malicious attack; (iii) prior submission of certain types of objects (or an object that is highly correlated upon determining a shared prescribed amount of similar data) to a cluster for malware analysis, and if so, whether or not such malware analysis has been completed (e.g., completed, experienced timeout event, awaiting processing, etc.) or the like.

In the event that logic the sensor $110_1$ detects that a prior preliminary analysis has been conducted on the object 204, in some instances, the sensor $110_1$ may discontinue further analysis of the object 204, especially when a prior preliminary analysis (e.g., by processing engine 600 of FIG. 6) has determined that the object 204 is benign (e.g., not malicious) or malicious (e.g., determined to have some association with malware). In these situations, the results from the prior analysis may be returned to the sensor $110_1$. This preliminary analysis may involve a comparison between a representation of the object 204 (e.g., bit pattern representation as a hash of the object 204 or portions of the object 204, certain content of the object 204, etc.) and stored representations of previously analyzed objects. Optionally, the preliminary analysis may further involve a comparison between the representation of the object 204 and representations of other objects analyzed by the cluster $150_1$ (or even other clusters) that have been determined to be benign (whitelist) or malicious (blacklist).

In the event that logic within the sensor $110_1$ (e.g., processing engine 600 of FIG. 6) detects that a prior preliminary (or malware) analysis has been conducted on the object 204, in some instances, the sensor $110_1$ may discontinue further analysis of the object 204, especially when the prior preliminary (or malware) analysis has determined that the object 204 is benign (e.g., not malicious) or malicious (e.g., determined to have some association with malware). It is noted that the presence of any prior preliminary analysis for certain object types. For example, where the object 204 is an Uniform Resource Locator (URL) or another type of reference to dynamically changing data, the sensor $110_1$ may routinely supply the metadata 202 to its associated broker computing node given the dynamic nature of content associated with the URL (or reference element). However, for other repeated malicious objects, the sensor $110_1$ may report the results from the prior analysis to the management system 192 at an elevated level to identify a re-occurring malicious attack.

In the situations noted above, the results from the prior analysis may be returned to the sensor $110_1$. This preliminary analysis may involve a comparison between a representation of the object 204 (e.g., bit pattern representation as a hash of the object 204 or portions of the object 204, certain content of the object 204, etc.) and stored representations of previously analyzed objects. Optionally, the preliminary analysis may further involve a comparison between the representation of the object 204 and representations of other objects analyzed by the cluster $150_1$ (or even other clusters) that have been determined to be benign (whitelist) or malicious (blacklist).

Additionally, based on a state of the prior preliminary analysis, the sensor $110_1$ may refrain from supplying the metadata 202 to its associated broker computing node (e.g., computing node $160_1$ or computing node $160_2$) to avoid initiating an in-depth malware analysis of the object 204. As an illustrative example, the sensor $110_1$ may refrain from supplying the metadata 202 when a prior submission has recently occurred and such analysis has not yet completed (and no timeout event has been detected). However, for Uniform Resource Locators (URLs) and other references to dynamically changing data, the presence of any prior preliminary analysis may not operate as a filter in determining whether to conduct a check as to whether the object 204 is suspicious.

In the event that no prior preliminary analysis of the object 204 has occurred (or occurrence with a timeout event) and the sensor $110_1$ conducts a second real-time analysis of the object 204, but does not detect that the object 204 is suspicious, the sensor $110_1$ may refrain from supplying the metadata 202 to its associated broker computing node. In other instances, however, the sensor $110_1$ may supply the metadata 202 to its associated broker computing node when the object is determined to be suspicious based on the preliminary analysis. For example, where the object 204 is an Uniform Resource Locator (URL), the sensor $110_1$ may routinely supply the metadata 202 to its associated broker computing node given the dynamic nature of content associated with a URL In response to the sensor $110_1$ detecting that the object 204 is suspicious, additional metadata may be added to the metadata 202 for storage, including a timeout period that is allocated based, at least in part, on characteristics of object 204 (e.g., object type). Metadata 202 and other metadata produced therefrom produces aggregated metadata 206, which is provided to one of the broker computing nodes (e.g., computing node $160_1$) that is assigned to support the sensor $110_1$ during a prior enrollment process and to initiate an in-depth malware analysis of the suspicious object 204. The aggregated metadata 206 may include (i) a sensor identifier (ID) 207 that identifies sensor $110_1$ as the source of metadata 202 (e.g., a serial number, a device identifier such as a Media Access Control "MAC" address, an IP address, and/or another identifier unique to the cluster $150_1$), (ii) a timestamp 208 that denotes the time of receipt of the suspicious object 204 (e.g., time of receipt, time of detection of suspiciousness, etc.), (iii) a timeout value 209 that denotes an amount of time remaining from an overall amount of time allocated for malware analysis of the object, (iv) representative content 210 of the suspicious object 204 (e.g., hash value, checksum, etc.), (v) object identifier 211, and/or (vi) an operation mode identifier 212 (e.g. active or passive). Other optional metadata may include, but is not limited or restricted to source or destination IP addresses, or the like.

In particular, a portion of the aggregated metadata 206 (generally referred to as "metadata 206") is analyzed by the analysis coordination system $220_1$ to determine whether an identical object or a determined malicious object with similar metadata (e.g., from the same malicious source, etc.) has already been analyzed by any of the computing nodes $160_1$-$160_4$. This may be accomplished by conducting a search of representative objects within the distributed data store 170 as shown in FIG. 1. If so, the results of the analysis are returned to the sensor $110_1$. If not, the metadata 206 is loaded into the distributed queue 175 (e.g., queue $175_1$). The metadata 206 in the queue $175_1$ may be accessible by any of the object analysis systems $240_1$-$240_4$ of the computing nodes $160_1$-$160_4$, where the metadata 206 identifies the location of the suspicious object 204 that is fetched for further analysis. According to this embodiment, the analysis coordination systems $220_1$ and $220_2$ have no involvement in the routing of metadata to a particular object analysis system.

As shown in FIG. 2, the difference between the "broker" computing nodes $160_1$ and $160_2$ and the analytic computing nodes $160_3$ and $160_4$ is whether or not the analysis coordination systems have been deactivated. Herein, for the "broker" computing nodes $160_1$ and $160_2$, analysis coordination systems $220_1$ and $220_2$ have been activated while the analysis coordination systems (not shown) for computing nodes $160_3$ and $160_4$ have been deactivated. It is noted, however, that all of the computing nodes $160_1$-$160_4$ within the same cluster $150_1$ feature an object analysis system $240_1$-$240_4$, respectively. Each of these object analysis systems $240_1$-$240_4$ includes logic that is capable of conducting an in-depth malware analysis of the object suspicious 204 upon determining to have sufficient processing capability.

More specifically, each object analysis system $240_1$-$240_4$, when determined to have sufficient processing capability or otherwise determined to have suitable analytical needs, accesses the queue 175 to obtain metadata associated with a suspicious object awaiting malware analysis. For example, during operation, the object analysis system $240_1$ may periodically and/or aperiodically (e.g., in response to completion of a prior malware analysis) access the queue 175 and obtain the metadata 206 associated with the suspicious object 204. Responsive to obtaining the metadata 206, the object analysis system $240_1$ accesses a portion of the metadata 206 to locate the storage location of the suspicious object 204, and thereafter, fetches the suspicious object 204. The suspicious object 204 may be stored in the sensor $110_1$, in the computing node $160_1$ or in an external network device (not shown).

Upon receipt of the suspicious object 204, the object analysis system $240_1$ conducts an in-depth malware analysis, namely any combination of behavior (dynamic) analysis, static analysis, or object emulation in order to determine the likelihood of the suspicious object 204 is associated with malware.

As shown, the analysis coordination system $220_1$ is configured to receive metadata associated with specific objects and provide information, inclusive of some or all of the metadata, to the queue 175. Thereafter, the analysis coordination system $220_1$ has no involvement in the routing of such metadata to any of the object analysis systems $240_1$-$240_4$ of the computing nodes. An object analysis system $240_1, \ldots$, or $240_4$ is configured to fetch metadata that is stored in the queue 175 when that object analysis system is determined to have sufficient processing capability to handle a deeper level analysis of the object.

Referring to FIG. 3, a block diagram of an exemplary embodiment of logic implemented within the sensor $110_1$ deployed within the threat detection system 100 of FIG. 1 is shown. According to this embodiment of the disclosure, the sensor $110_1$ comprises one or more hardware processors 300 (referred to as "processor(s)"), a non-transitory storage medium 310, and one or more network interfaces 320 (referred to as "network interface(s)"). These components are at least partially encased in a housing 340, which may be made entirely or partially of a rigid material (e.g., hard plastic, metal, glass, composites, or any combination thereof) that protects these components from environmental conditions. Where the sensor $110_1$ is software, the interface may operate as an interface to an Application Programming Interface (API) for example.

The processor(s) is a multi-purpose, processing component that is configured to execute logic 350 maintained within the non-transitory storage medium 310 that is operating as a data store. As described below, the logic 350 may include, but is not limited or restricted to, (i) packet (object) analysis logic, (ii) metadata extraction logic 360, (iii) timestamp generator logic 365, (iv) events (timeout) monitoring logic 370, (v) metadata data store (MD S) monitoring logic 375, (vi) notification logic 380, and/or (vii) result aggregation logic 385. One example of processor(s) 300 include an Intel® (x86) central processing unit (CPU) with an instruction set architecture. Alternatively, processor(s) 300 may include another type of CPUs, a digital signal processor (DSP), an Application Specific Integrated Circuit (ASIC), a field-programmable gate array (FPGA), or any other hardware component with data processing capability.

As shown, the network interface(s) 320 is configured to receive the information 200, including metadata 202 and object 204, directly from the network or via a network tap. The information 200 may be temporarily stored prior to processing. Herein, upon receiving the information 200, the processor(s) 300 (e.g., packet analysis logic 355) may conduct an analysis of at least a portion of the information 200, such as the object 204 for example, to determine whether the object 204 is suspicious. If so, the processor 300 processes the metadata extraction logic 360 that, during such processing, extracts the metadata 202 from the received information 200 and assigns the object identifier 211 for the metadata 202 and the suspicious object 204, which may be unique for the cluster (referred to as "unique identifier" or "UID"). The metadata 202 along with other information is stored in a metadata data store 390 while the suspicious object 204 may be stored in a content data store 395. The content data store 395 may be part of the non-transitory storage medium 310 of the sensor $110_1$. It is contemplated, however, that the content data store 395 may be stored on the computing node $160_1$, or stored externally from the sensor $110_1$ in another network device.

In response to detecting the storage of the metadata 202 in the metadata data store 390, the MDS monitoring logic 375 accesses the metadata data store 390 to obtain at least a portion of the aggregated metadata 206. Thereafter, the MDS monitoring logic 375 determines a (remaining) timeout value, which represents an amount of time allocated for analyzing the object 204 for malware that still remains, and provides the aggregated metadata 206 to the cluster $150_1$.

The aggregated metadata 206 includes (i) a sensor identifier 207, (ii) a timestamp 208, (iii) the timeout value 209, (iv) a representation 210 of the suspicious object 204 (e.g., hash value, checksum, etc.), (v) an object identifier (UID) 211 and/or (vi) the operation mode identifier 212 (e.g. active or passive), as illustrated. Thereafter, the MDS monitoring logic 375 generates a request message 376, including the portion of the metadata 206, to send to an analysis coordination system associated with a broker computing node that is assigned to service the sensor $110_1$.

Additionally, the UID 211 along with certain information associated with suspicious object 204 may be stored in a content data store 395. The content data store 395 may include a data store that is part of the non-transitory storage medium 310 of the sensor $110_1$. It is contemplated, however, that the content data store 395 may be stored on the computing node $160_1$, or stored externally from the sensor $110_1$ in another network device.

For a certain type of object, such as the suspicious object 204 being a file for example, the file and its related UID are collectively stored in the content data store 395. For another type of object, such as a URL or a document with an embedded script for example, the URL (or document with the embedded script) along with information associated with network traffic pertaining to the URL (or document with embedded script) may be collectively stored with its related UID. The information associated with the network traffic may include information associated with web pages accessed via the URL (or script) over a period of time (e.g., during a communication session, portion of a communication session, etc.).

Additionally, the sensor $110_1$ comprises timestamp generator logic 365, which is configured to receive a time value from a source clock and generate a timestamp based on the clock value and the received information 200. For instance, according to one embodiment of the disclosure, the timestamp generator logic 365 generates a timestamp once the packet analysis logic 355 determines that the object 204 is suspicious (and no prior preliminary analysis of the object 204 precludes continued analysis of the object 204 as described above). Of course, it is contemplated that the timestamp generator logic 365 may be configured to generate the timestamp in response to extraction of the metadata by the metadata extraction logic 360 or storage of the suspicious object 204 with the content data store 395.

Figure 5A:
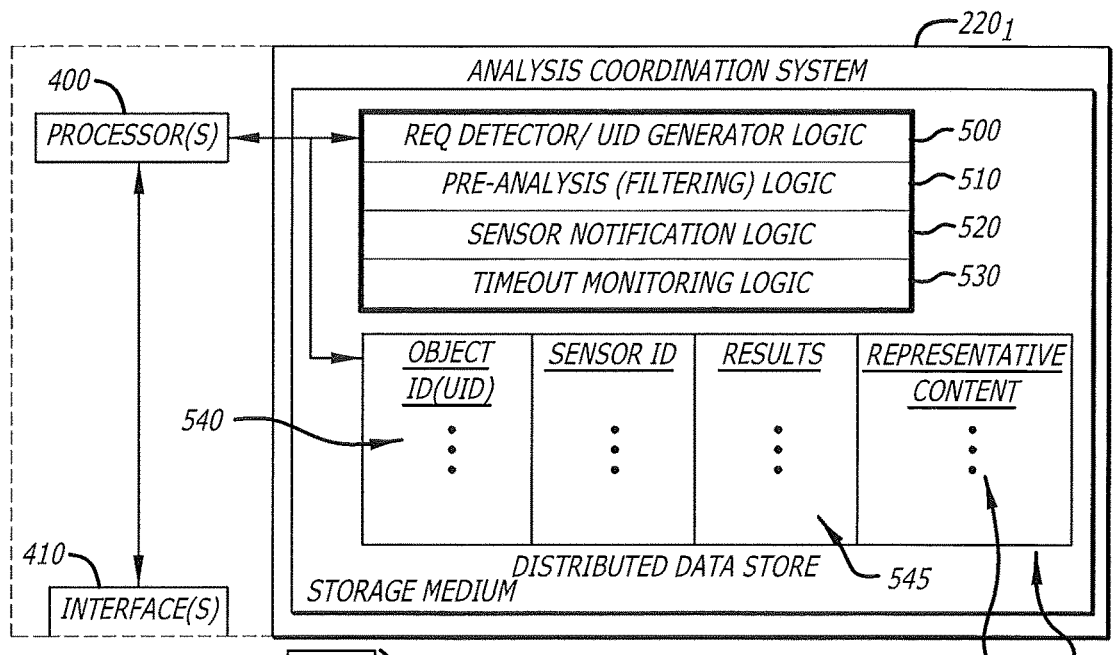
FIG. 5A is a block diagram of an exemplary embodiment of logic implemented within an analysis coordination system that is operating as part of the computing node of FIG. 4.
Figure 5A:
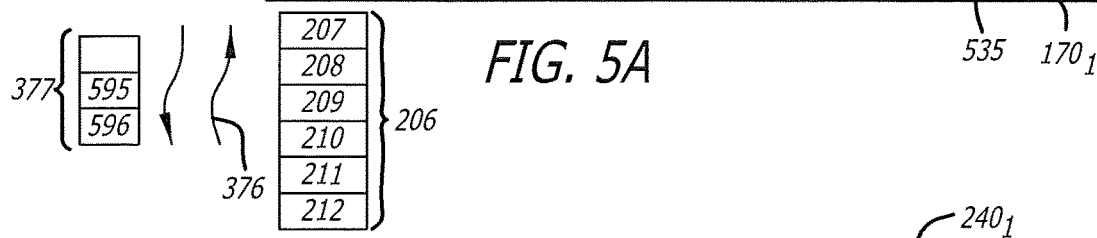
Figure 5B:
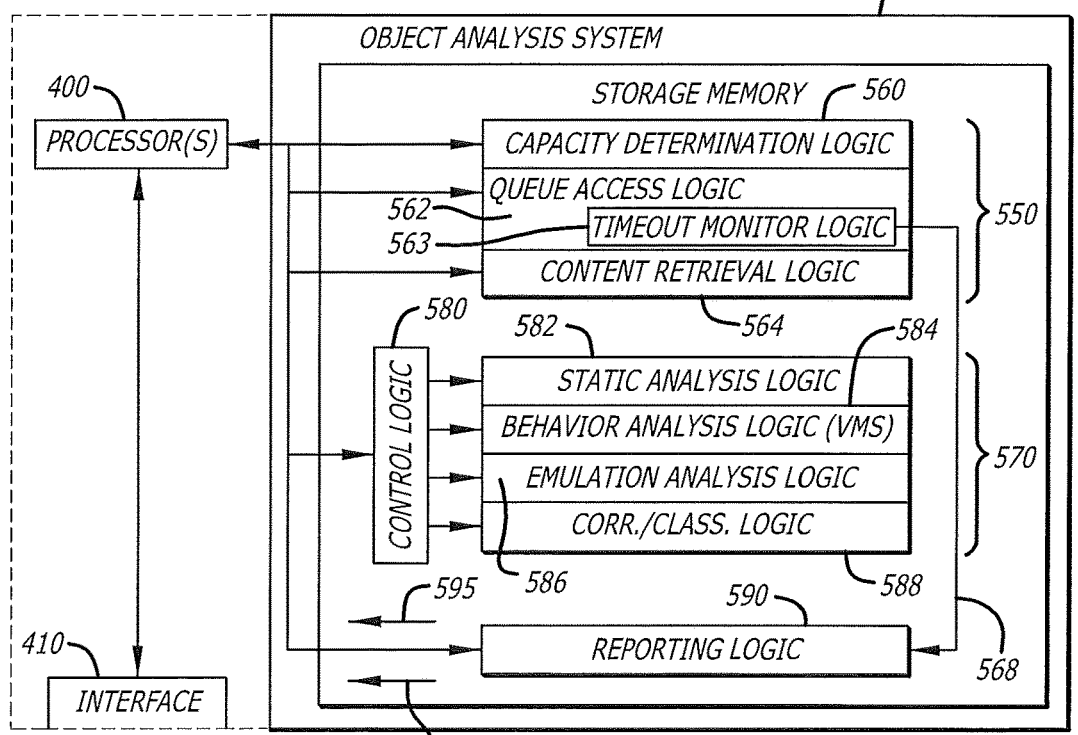
FIG. 5B is a block diagram of an exemplary embodiment of logic implemented within an object analysis system that is operating as part of the computing node of FIG. 4.
Figure 5B:
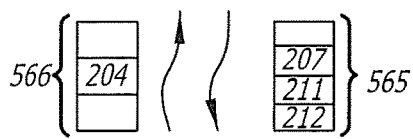

The sensor $110_1$ further includes notification logic 380, which is responsible for handling communications 377 with particular logic within the computing node $160_1$, namely sensor notification logic (see FIG. 5A) or reporting logic (see FIG. 5B). Such communications 377 may include (i) analysis results 595 from reporting logic of an object analysis system or (ii) information 596 from the sensor notification logic 520 that signifies (a) the suspicious object 204 has already been analyzed or (b) a timeout event has been detected for the portion of the metadata 206 residing in the queue $175_1$ that originated from the sensor $110_1$.

As an illustrative example, in response to receipt of communications from the sensor notification logic, which may include the UID 211 for the suspicious object 204, the sensor identifier and the unique identifier of a previously analyzed object, the notification logic 380 may access the metadata data store 390 in order to identify that the suspicious object 204 has been processed (e.g., set a timeout indicator associated with an entry of the metadata data store 390 that includes the suspicious object 204). Although not shown, the notification logic 380 may further notify the event (timeout) monitoring logic 370 that analysis of the suspicious object 204 has been completed and no timeout events have occurred. This may prompt the event (timeout) monitoring logic 370 to conduct general housekeeping tasks, including reporting of a portion of the metadata associated with the timed out suspicious object and/or signaling of the sensor $110_1$ to conduct a re-enrollment process.

According to one embodiment, the re-enrollment process is performed so that the sensor $110_1$ may evaluate its cluster pairing, especially when the particular cluster $150_1$ to which the sensor $110_1$ is presently enrolled may be overloaded and is not providing a desired level of malware analysis and protection in accordance with the selected subscription level. The re-enrollment process may take into account the workloads on each of the clusters $150_2$-$150_N$ and/or computing nodes that are available to support the customer (e.g., based on geography, type of object, etc.). Where additional clusters are available, the re-enrollment process may reassign the sensor $150_1$ to one of the different clusters $150_2$-$150_N$. Where no additional clusters are available, additional clusters and/or computing nodes may need to be procured and/or configured by the customer, where the purchase may be prompted in response to the management system or the sensor $110_1$ issuing appropriate messages to a network administrator along with information to support the purchase and/or configuration (e.g., statistics such as timeout number or frequency of the sensor $110_1$, workload of cluster $150_1$-$150_N$, etc.).

Referring to both FIG. 2 and FIG. 3, when the "broker" computing node $160_1$ for the sensor $110_1$ is operating in a passive mode, as provided by the operation mode identifier 212, the result aggregation logic 385 of the sensor $110_1$ may periodically or aperiodically (e.g., in response to a timeout event) access the distributed data store $170_1$ for analysis results or timeout events. The access may be based, at least in part, on the UID 211. Alternatively, when the "broker" computing node $160_1$ is operating in an active mode, the timeout events associated with suspicious objects detected by the sensor $110_1$ may be provided from event (timeout) monitoring logic within the broker computing node $160_1$ to the notification logic 380 of the sensor $110_1$. Also, the results of an in-depth malware analysis of the suspicious object 204 may be provided to the notification logic 380 of the sensor $110_1$ from reporting logic of the computing node handling the in-depth malware analysis (e.g., "broker" computing node $160_1$ or another computing node) as well as timeout events detected by the computing node handling the in-depth malware analysis. The notification logic 380 may provide the results of the in-depth malware analysis to metadata data store 390 and/or content data store 395 for storage or may store data to signify completion of the analysis or an occurrence of a timeout event that denotes expiration of the time allocated for conducting malware analysis of the suspicious object 204.

In response to neither the notification logic 380 nor the result aggregation logic 385 receiving information that conveys the suspicious object 204 has been analyzed before a timeout period has elapsed (e.g., no analysis results have been uploaded into the distributed data store $170_1$ of FIG. 1 or provided to notification logic 380), the event (timeout) monitoring logic 370 determines that a timeout event has occurred and notifies the processor 300 of the timeout event. Normally, the processor(s) 300 record information associated with the timeout event into a log 398 that maintains analytic data associated with sensor operations (e.g., number of timeout events, number of objects offered for analysis by the sensor $110_1$, etc.). Data, including the stored analytic data, may be sent as messages by the processor(s) 300 to the management system and/or directly to network administrators at an enterprise being monitored by sensor $110_1$. It is contemplated, however, that the processor(s) 300 may decide to resubmit the suspicious object 204, where the decision may be based on the type of object and/or the level of suspiciousness associated with that object.

Figure 4:
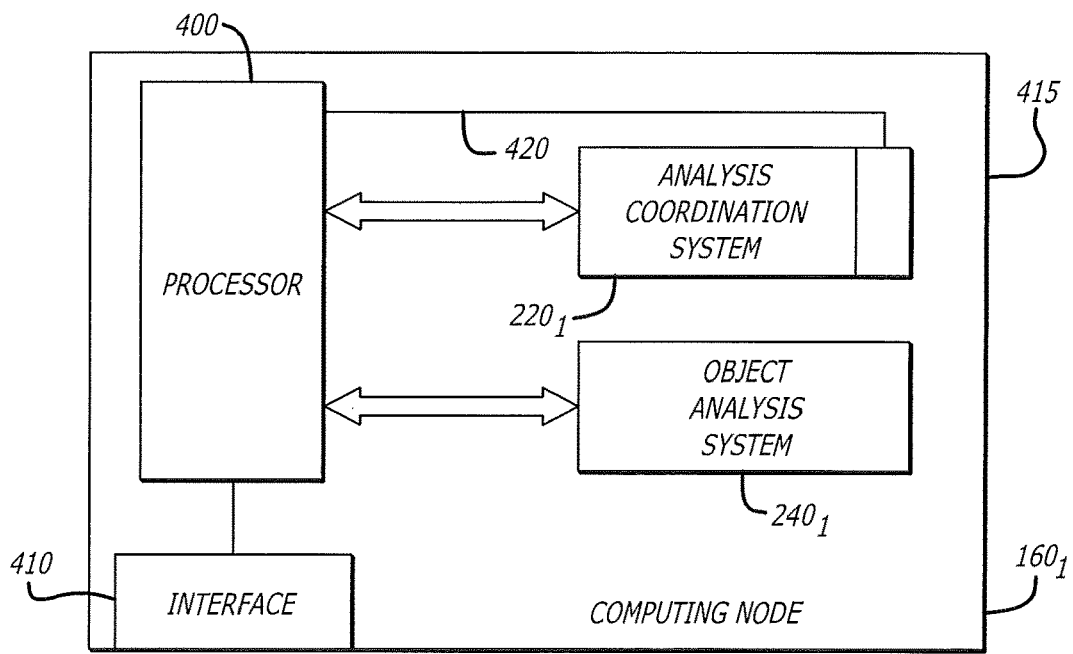
FIG. 4 is a block diagram of an exemplary embodiment of logic implemented within a computing node configured in accordance with an asynchronous load balancing architecture.

Referring now to FIG. 4, a block diagram of an exemplary embodiment of logic implemented within the computing node $160_1$ that is operating as part of the centralized analysis system 140 of FIG. 1 is shown. Herein, the computing node $160_1$ comprises one or more processors 400, one or more network interfaces 410, logic associated with the analysis coordination system $220_1$ and logic associated with the object analysis system $240_1$. These components are at least partially encased in a housing 415, which may be made entirely or partially of a rigid material (e.g., hard plastic, metal, glass, composites, or any combination thereof) that protects the components from environmental conditions.

As shown, the processor(s) 400 is figured to activate or deactivate the analysis coordination system $220_1$ as illustrated by a control line 420. When the analysis coordination system $220_1$ is activated, the processor(s) 400 supports communications between the analysis coordination system $220_1$ and any enrolled sensors (e.g., sensor $110_1$). The contents of the analysis coordination system $220_1$ are shown in FIG. 5A.

Referring to FIG. 5A, a block diagram of an exemplary embodiment of logic implemented within an analysis coordination system $220_1$ that is operating as part of the computing node $160_1$ of FIG. 4 is shown. Herein, according to one embodiment of the disclosure, the analysis coordination system $220_1$ features a local storage medium that includes logic, such as request detector/ID generator logic 500, filtering (pre-analysis) logic 510, and sensor notification logic 520 for example, that relies on processing functionality provided by the processor(s) 400 and connectivity provided by the network interface(s) 410 of the computing node $160_1$. Of course, it is contemplated that the analysis coordination system $220_1$ may be configured to utilize a different processor, such as one or more different processor cores for example, than the object analysis system $240_1$ within the same computing node $160_1$. Additionally, the analysis coordination system $220_1$ includes a portion of the local storage medium that operates as part of the distributed data store $170_1$ (as shown) or has access to the distributed data store $170_1$ hosted within a separate memory device as shown in FIG. 1. As stated above, the distributed data store $170_1$ is accessible by each and every analysis coordination system with the cluster $150_1$ that is activated (e.g., analysis coordination systems $220_1$-$220_2$ of FIG. 4).

The request detector/ID generator logic 500 is configured to detect the request message 376 with the metadata 206 from the MDS monitoring logic 375 of FIG. 3 and provide the metadata 206 to the pre-analysis (filtering) logic 510. Identified by dashed lines, it is contemplated that the detector/ID generator logic 500 may be adapted to generate a response message that returns the unique identifier (UID) for the metadata 206 and suspicious object 204 to the MDS monitoring logic 375 if the sensor $110_1$ does not feature logic to generate an object identifier.

The pre-analysis (filtering) logic 510 determines whether the metadata associated with a suspicious object for analysis corresponds to any previously analyzed suspicious object. This determination may involve a comparison of representative content 210 of the suspicious object 204, which is included as part of the received metadata 206, against representative content 535 of previously analyzed suspicious objects stored in the distributed data store 170, including distributed data store $170_1$. The representative content 210 of the suspicious object 204 may include a checksum or a hash value of the suspicious object 204. It is contemplated that the representative content 210 may include other parameters such as an indicator of a timeout event has occurred during processing of the suspicious object 204 or the original name of the object, especially when the suspicious object 204 is a file. The presence of other parameters may be useful in reducing the chances of false negatives in such detection.

Additionally, it is contemplated that the pre-analysis (filtering) logic 510 may be configured to identify one or more characteristics of the suspicious object 204, and based on the characteristic(s), determine whether further in-depth malware analysis of the suspicious object 204 is not desired in order to reduce workload. For example, the metadata 206 may provide information that identifies the suspicious object 204 is a type of object for which further in-depth malware analysis is not currently targeting or has little significance when compared to other types of objects. As another example, the metadata 206 may identify that the suspicious object 204 originated from a trusted source. Yet as another example, the metadata 206 may identify that the suspicious object 204 is associated with a particular software profile that is different from objects with certain software profiles that are now more frequently under attack. This determination may involve a comparison of the sensor ID 207 and/or the representative content 210 of the suspicious object 204, which is included as part of the received metadata 206, against content 535 stored in the distributed data store 170, including distributed data store $170_1$.

In response to determining that the representative content 210 associated with the suspicious object under analysis compares to representative content 535 of a previously analyzed object, the sensor notification logic 520 signals the notification logic 380 of FIG. 3 within the sensor $110_1$ that the suspicious object 204 has already been processed (or no in-depth, behavioral malware analysis is of interest at this time). Such signaling may include the UID 211 and sensor ID 207 associated with the metadata 206 being processed by the pre-analysis (filtering) logic 510 and the UID 540 associated with the previously analyzed object. Thereafter, the results 545 of the analysis may be obtained from the distributed data store $170_1$ utilizing the UID 540 associated with the previously analyzed object or received via the object analysis system conducting an analysis of the suspicious object 204. It is contemplated that, for types of suspicious objects (e.g., URLs), in-depth malware analyses are conducted even when the representative content 210 associated with the suspicious object 204 compares to representative content 535 of a previously analyzed object. This occurs because the content of websites is dynamic. For these cases, the pre-analysis (filtering) logic 510 may bypass the above-described operations and store a portion of the metadata 206 in the queue $175_1$.

In response to determining that the representative content 210 associated with the suspicious object 204 under analysis fails to compare to any representative content associated with previously analyzed objects stored in the distributed data store 170, the pre-analysis (filtering) logic 510 records the UID 211 along with the representative content 210 and the sensor ID 207 that are provided as part of the metadata 206 into the distributed data store $170_1$. The results of the analysis are subsequently uploaded to a corresponding entry associated with the UID 211 at a later time after completion of the malware analysis of the suspicious object 204. The results may be referenced by other analysis coordination systems (analysis coordinators) within the cluster to mitigate unnecessary workload.

The timeout monitoring logic 530 is responsible for queue management through the monitoring at least two different types of timeout events at the queue $175_1$. For a first type of timeout event, namely the object 204 failing to undergo malware analysis by a prescribed timeout period, the timeout monitoring logic 530 utilizes the timeout value 209 provided as part of the queued metadata 206. The timeout value 209 generally synchronizes timing in the monitoring of timeout events by the object analysis system $240_1$ and the sensor $110_1$. For this type of timeout event, the timeout monitoring logic 530 monitors the metadata queuing time for the metadata 206 associated with the object 204 to determine where this duration meets or exceeds the timeout value 209 (e.g., the metadata 206 has resided in the queue $175_1$ for a duration of time that is approximately equal to or greater than the timeout value 209). For the second type of timeout event, the timeout monitoring logic 530 monitors the metadata queuing time for the object 204, and when the duration exceeds a prescribed threshold, the timeout monitoring logic 530 may initiate actions that cause the metadata 206 to be made available to other object analysis systems. The timeout monitoring logic 530 is communicatively coupled to the distributed data store $170_1$ and the sensor notification logic 520 to identify whether metadata 206 experienced a timeout event.

In response to the first type of timeout event, when the sensor $110_1$ is operating in active mode, the timeout monitoring logic 530 may identify (flag) the metadata 206 (or portion thereof) stored within the distributed data store $170_1$ that a timeout event has occurred and flush the portion of the metadata 206 from the queue $175_1$. The result aggregation logic 385 of the sensor $110_1$ may detect the timeout event upon accessing the distributed data store $170_1$ for analysis results. When the sensor $110_1$ is operating in passive mode, the timeout monitoring logic 530 may detects that the metadata 206 (or portion thereof) stored within the distributed data store $170_1$ has experienced a timeout condition, and if so, flush the portion of the metadata 206 from the queue $175_1$ and provide information 532 that identifies metadata 206 associated with suspicious object 204 has not been timely processed (i.e. a timeout event occurred).

Referring back to FIG. 2, each object analysis system $240_1$-$240_4$ of the computing nodes $160_1$-$160_4$ is responsible for retrieval of metadata that denotes a suspicious object awaiting an in-depth malware analysis to be conducted thereon. Furthermore, upon retrieval of the suspicious object, the object analysis system $240_1$, . . . , or $240_4$ is responsible for conducting the malware analysis on the suspicious object. A logical representation of an object analysis system, such as object analysis system $240_1$ for example, is shown in FIG. 5B.

Referring to FIG. 5B, a block diagram of an exemplary embodiment of logic implemented within the object analysis system $240_1$ that is operating as part of the computing node $160_1$ of FIG. 4 is shown. According to one embodiment of the disclosure, the object analysis system $240_1$ features logic, namely management logic 550, object processing logic 570 and reporting logic 590, that relies on processing functionality provided by the processor(s) 400 and connectivity provided by the network interface(s) 410 of the computing node $160_1$. Of course, it is contemplated that the object analysis system $240_1$ may be configured to utilize a different processor, such as one or more different processor cores for example, than the analysis coordination system 220₁ operating within the same computing node 160₁. As shown, the management logic 550 includes capacity determination logic 560, queue access logic 562, and content retrieval logic 564. The object processing logic 570 includes control logic 580 that orchestrates operations conducted by the static analysis logic subsystem 582, behavior analysis logic subsystem 584, emulation analysis logic subsystem 586, and correlation/classification logic 588.

Herein, the capacity determination logic 560 is responsible for determining whether the computing node 160₁ featuring the object analysis system 240₁ has sufficient processing capacity to handle another in-depth malware analysis of a suspicious object. This may involve a checking of current processor workload, the number of virtual machines available for behavioral analysis of the suspicious object, or the like. If not, the capacity determination logic 560 refrains from notifying the queue access logic 562 to access metadata within the distributed queue 175. If so, the capacity determination logic 560 notifies the queue access logic 562 to commence selection of metadata from the distributed queue 175 of FIG. 2. The selection may be based on a First-In-First-Out (FIFO) queue selection scheme where the oldest metadata awaiting processing by an analysis system is selected. Of course, it is contemplated that the selection scheme may be arranged in accordance with factors in addition to or other than capacity, such as a level of suspiciousness of the object, anticipated object type, type of communications being monitored (e.g., email, network traffic, etc.), sensor priority where certain sensors may be located to protect certain highly sensitive resources within the enterprise network, service levels (QoS) associated with the sensor or analysis coordination system as identified by the metadata, user-specified priority based on selected object characteristics, geographic location of the computing node 160₁ in relation to the sensor that captured the metadata (in the same region, state, country, etc.) as may be required by privacy laws or service level agreements, or the like.

Also, queue access logic 562 may include timeout monitor logic 563 that determines whether the metadata removed from the distributed queue 175 has experienced a timeout. If so, the timeout monitor logic 563 provides the UID and sensor ID associated with the metadata to the reporting logic 590 via communication path 568 to bypass in-depth malware analysis of the suspicious object by the object processing logic 570. In response, the reporting logic 590 is configured to provide information 591 associated with the timeout event (hereinafter "timeout event information 591") to the distributed data store 170 and/or the notification logic 380 of the sensor 110₁ of FIG. 2 when the object analysis system 240₁ is operating in active mode.

Upon receipt of the selected metadata, the content retrieval logic 564 commences retrieval of the suspicious object corresponding to the metadata. This retrieval may be accomplished by obtaining the sensor ID 207 that indicates what sensor is responsible for the submission of the retrieved metadata and storage of the object, along with the UID provided by the metadata for identifying the object corresponding to the metadata. A request message 565 is sent to the sensor including the sensor identifier 207 and UID 211 as parameters. A response message 566 may be returned from the sensor, where the response message 566 includes a link to the suspicious object (from which the suspicious object may be accessed), such as IP addresses, URLs, domain names, or the suspicious object itself (i.e., object 204).

Thereafter, the returned information (link to object or object 204) may be temporarily stored in a data store (not shown) awaiting processing by one or more of the static analysis logic subsystem 582, the behavior analysis logic subsystem 584, and/or the emulation analysis logic subsystem 586. The control logic 580 controls the processing of the suspicious object 204 as described below for FIG. 7. The results of the malware analysis being conducted through the processing of the object by one or more of the static analysis logic subsystem 582, the behavior analysis logic subsystem 584, and/or the emulation analysis logic subsystem 586 are provided to the correlation/classification logic 588. The correlation/classification logic 588 receives the results and determines whether the results denote that the likelihood of the suspicious object 204 being associated with malware exceeds a second prescribed threshold. If so, the suspicious object 204 is determined to be malicious. Otherwise, the suspicious object 204 is determined to be non-malicious.

The analytic results from the correlation/classification logic 588 along with certain portions of the metadata associated with the object (e.g., UID 211) is provided to the reporting logic 590. The reporting logic 590 may be responsible for generating alerts directed to the client administrators or management system as shown in FIG. 1. Additionally, or in the alternative, the reporting logic 590 may be responsible for providing at least a portion of the analytic results 595 to the distributed data store 170 for storage in accordance with the UID associated with the analyzed, suspicious object. The sensor 110₁ may gain access the stored analytic results 595 and provide the alerts to the network administrator 190 as illustrated in FIG. 1 or may forward the analytic results 595 to the management system 192 that may issue the alerts as well as distribute threat signatures generated by (or based on data supplied from) the object processing logic 570.

Figure 6:
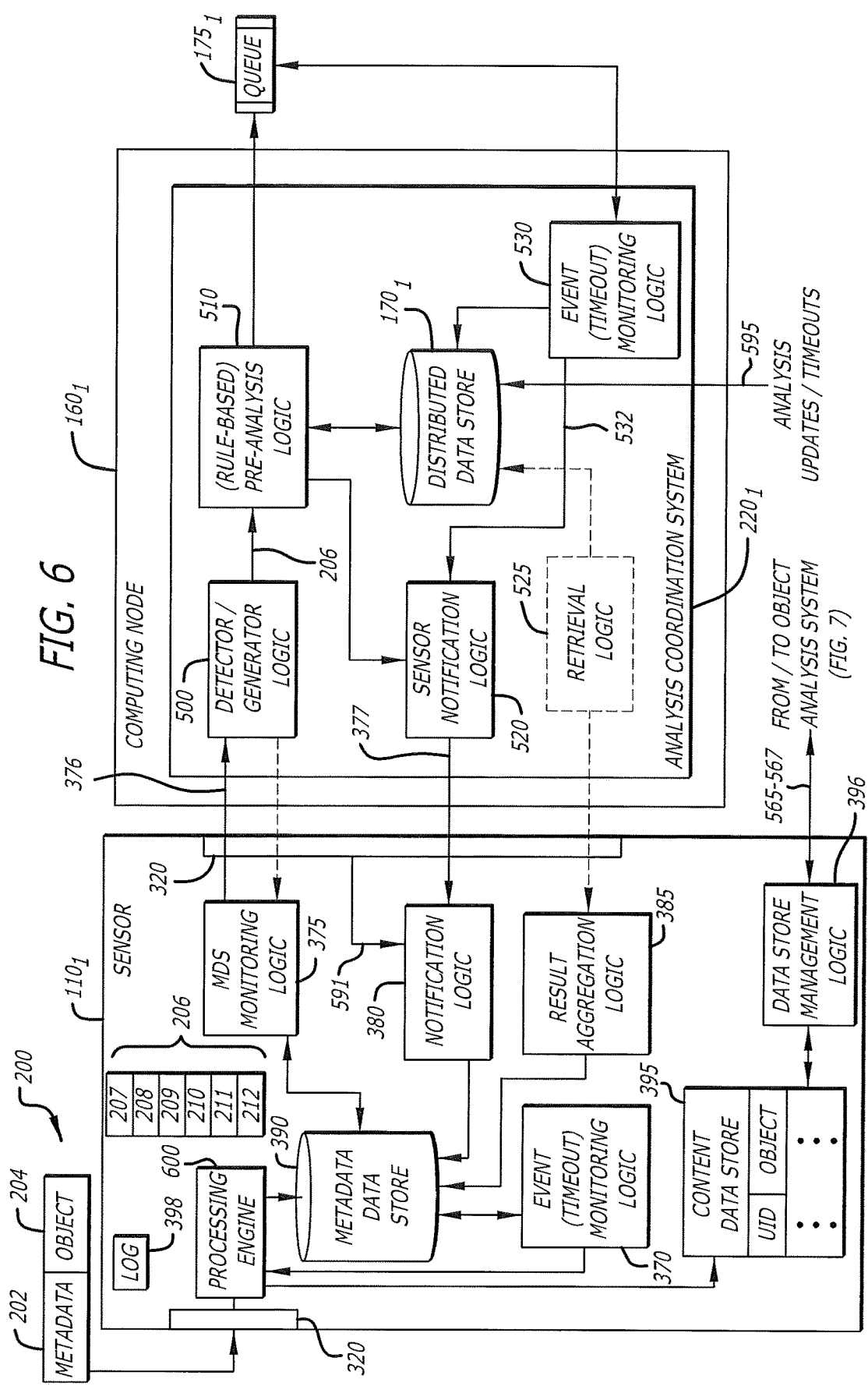
FIG. 6 is a flow diagram of operations conducted by an exemplary embodiment of logic implemented within the sensor of FIG. 3 and the computing node of FIG. 4.

Referring to FIG. 6, a flow diagram of operations conducted by an exemplary embodiment of logic implemented within the sensor 110₁ and the computing node 160₁ is shown. Herein, the processing engine 600 of the sensor 110₁ is configured to receive the information 200, including the metadata 202 and the object 204, directly from the network or via a network tap. Although not shown, the information 200 may be temporarily stored prior to processing. The processing engine 600 includes the packet analysis logic 355, metadata extraction logic 360 and the timestamp generator logic 365 of FIG. 3.

After receipt of the information 200, the processing engine 600 (e.g., inclusive of logic 355-365 of FIG. 3) conducts an analysis of at least a portion of the information 200, such as the object 204 for example, to determine whether the object 204 is suspicious. If so, the processing engine 600 (metadata extraction logic 360 of FIG. 3) extracts the metadata 202 from the received information 200 and may assigns a UID 211 to the metadata 202. Furthermore, the processing engine 600 may include logic, such as a feature of timestamp generation logic 365 or a separate timeout period computation logic (not shown), which determines a timeout period allocated to conduct a malware analysis on the object (e.g., seconds, minutes or hours). Some of the metadata 202 along with additional information (e.g., sensor ID, etc.), referred to as the aggregated metadata 206, may be stored in the metadata data store 390 while the suspicious object 204 may be stored in the content data store 395. The metadata extraction logic 360 relates the UID 211 with the suspicious object 204.

Additionally, a portion of the processing engine 600 (e.g., timestamp generator logic 365 of FIG. 3) is configured to generate a timestamp with receipt of the information 200. For instance, according to one embodiment of the disclosure, the processing engine 600 (e.g., timestamp generator logic 365) may generate a timestamp upon determining that the object 204 is suspicious. Of course, the point of time when the timestamp is generated may vary anywhere between initial detection of the information 200 by the sensor $110_1$ and the fetching of the metadata 202 by the MDS monitoring logic 375. The occurrence of a timeout event is based on a period of time (timeout period) that has elapsed and no information (received or fetched) identifies that a malware analysis for a particular object has occurred, where the duration of the timeout period may be fixed or may vary depending on the type of content under analysis (e.g., object type). For example, the timeout period may be fixed for certain object types or all object types. Alternatively, the timeout period may be dynamic that provides flexibility for increasing or decreasing the timeout period of time based on findings or service subscription levels or customer needs. It is contemplated that the timeout period may be initially stored as part of the metadata associated with object 204, while the timeout value 209 (remaining amount of timeout period for analysis of the object 204) may be provided to the cluster.

The MDS monitoring logic 375 may be configured to poll the metadata data store 390 for newly stored metadata (e.g., aggregated metadata 206). In response to detecting storage of the aggregated metadata 206 in the metadata data store 390, the MDS monitoring logic 375 fetches at least a portion of the aggregated metadata 206 for forwarding to the analysis coordination system $220_1$ of the computing node $160_1$ and computes the timeout value 209 based on the timeout period. This portion of the aggregated metadata 206 may include, but is not limited or restricted to the following: (i) the sensor ID 207 for sensor $110_1$, (ii) the timestamp 208 that identifies a start time for the analysis of the suspicious object 204, (iii) the assigned timeout value 209 (e.g., a time remaining from a time assigned by the processing engine that is based, at least in part, on the object type), (iv) representative content 210 of the suspicious object 204 (e.g., hash value, checksum, etc.), (v) UID 211 of the suspicious object, and/or the operation mode identifier 212. Thereafter, the MDS monitoring logic 375 generates a request message 376, including some or all of the aggregated metadata 206 (referenced as "metadata 206"), to the analysis coordination system $220_1$ that is assigned to service the sensor $110_1$.

The request detector/ID generator logic 500 is configured to receive the request message 376 from the MDS monitoring logic 375 and provide the metadata 206 to the pre-analysis (filtering) logic 510. It is contemplated that, in response to providing the request message 376 to the request detector/ID generator logic 500, the request detector/ID generator logic 500 may additionally assign a UID associated with at least a portion of the metadata 206 and return the UID to the MDS monitoring logic 375. Thereafter, the MDS monitoring logic 375 would relate the UID to the metadata 206, where such metadata and its relationship are stored in the metadata data store 390.

As shown, the request detector/ID generator logic 500 of the analysis coordination system $220_1$ provides the metadata 206 to the pre-analysis (filtering) logic 510. Herein, the pre-analysis (filtering) logic 510 determines, from content within the metadata 206, whether the suspicious object 204 corresponds to any previously analyzed suspicious object within the cluster $150_1$ or perhaps within other clusters $150_2$-$150_N$ where the distributed data store $170_1$ is updated based on stored content in other computing nodes $160_2$-$160_P$ or computing nodes in other clusters $150_2$-$150_N$. This determination involves a comparison of representative content 210 (e.g., checksum, hash value, etc.) UID 211 (or original object name) of the suspicious object 204, which is part of the metadata 206, against representative content of previously analyzed suspicious objects stored in the distributed data store 170.

In response to determining that the representative content 210 for the suspicious object 204 compares to representative content of a previously analyzed object, the pre-analysis (filtering) unit 510 signals the sensor notification logic 520 to transmit a message to the notification logic 380 within the sensor $110_1$ that signifies that the suspicious object 204 has already been processed. The message may include the UID 211 and sensor ID 207 associated with the metadata 206 being processed by the pre-analysis (filtering) logic 510 and the UID associated with the previously analyzed object. Thereafter, the results of the analysis may be obtained from the distributed data store 170 utilizing the UID associated with the previously analyzed object.

Responsible for handling communications with the sensor notification logic 520 and upon receipt of communications from the sensor notification logic, the notification logic 380 uses the UID 211 of the suspicious object 204 to access the metadata data store 390 to indicate that the suspicious object 204 has been processed and notify the event (timeout) monitoring logic 370, through modification of an entry associated with the metadata 206 corresponding to object 204 in metadata data store 390 that analysis of the suspicious object 204 has been completed. The result aggregation logic 385 may be configured to periodically or aperiodically (e.g., in response to a timeout event) send a request message to retrieval logic 525 to access the distributed data store 170 for results associated with the suspicious object 204 corresponding to the UID 211.

However, in response to determining that the representative content 210 of the suspicious object 204 under analysis fails to compare to any representative content within the distributed data store 170, the pre-analysis (filtering) logic 510 creates a storage entry associated with the suspicious object 204, including the UID 211 along with the representative content 210 and the sensor ID 207 that are provided as part of the metadata 206 into the distributed data store 170. The results of the analysis are subsequently uploaded into this storage entry after completion of the malware analysis of the object.

In the event that the timeout monitoring logic 370 detects a timeout event, which signifies that the suspicious object 204 has not been analyzed by an analysis system before a timeout period has elapsed (e.g., the result aggregation logic 385 has not been able to retrieve analytic results 595 associated with the suspicious object 204 from the distributed data store $170_1$ when broker computing node $160_1$ is operating in passive mode), the timeout monitoring logic 370 notifies the processing engine 600 of the timeout event. Additionally, the notification logic 380 may be adapted to signify a timeout event (or failure to analyze the suspicious object 204 associated with provided metadata 206 within a prescribed period of time that may be determined based on the timeout period, the timestamp 208 and the current clock value) in response to receipt of timeout event information 591 via communication path 568 or information associated with metadata 206 within distributed data store $170_1$ when the broker computing node $160_1$ is operating in active mode. When operating in passive mode, the notification logic 380 may be adapted to signify a timeout event upon receipt of information 532 that identifies metadata associated with suspicious object 204 has not been timely processed. This information 532 (or portion thereof) may also be provided for storage with the distributed data store 170 (via distributed data store $170_1$), which is accessible by other computing nodes $160_2$-$160_P$.

Herein, the processing engine 600 may record information associated with the timeout event into the log 398, which maintains analytic data associated with the sensor operations (e.g., number of timeout events, number of objects offered for analysis by the sensor $110_1$, etc.). Alternatively, the processing engine 600 may resubmit the suspicious object 204, which may be accomplished, for example, by toggling a flag associated with a storage entry for the aggregated metadata 206 that causes the aggregated metadata 206 to appear as being newly added to the metadata data store 390. The MDS monitoring logic 375 would commence fetching a portion of the aggregated metadata 206, as described above.

More specifically, communicatively coupled to the management system 192 of FIG. 1, which is operating as an on-premises management system, the sensor $110_1$ may upload the analytic data that includes information associated with the timeout events (e.g., sensor ID 207, timestamp 208, timeout value 209, and/or object identifier 211 or other metadata associated with the timed out object) to the management system 192. Although not illustrated in FIG. 6, the management system 192 may be configured to determine, based on an aggregate of all analytic data associated with timeout events received from the managed sensors within the threat detection system along with information from the sensor enrollment process (e.g., cluster servicing the sensor, geography of the cluster, etc.) to create reported statistics. The statistics may be based on a per sensor basis or across sensors (in the aggregate) supported at the customer's premises.

According to one embodiment of the disclosure, the reported statistics may provide information that certain computing nodes of a centralized analysis system within the threat detection system lack capacity to properly service a particular managed sensor or managed sensors. The statistics may include the number and/or frequency of timeout events, metadata on the type of objects under analysis, detected levels of suspiciousness for objects being analyzed, and/or estimated performance increases on a sensor, multi-sensor, or cluster basis based on the change of subscription level. The subscription levels may identify different tiers (levels) of service (e.g., a service level with basic malware analysis functionality, another service level with more robust malware analysis such as increased analysis time per object, increased or user-selectable guest image support, greater quality of service than offered with the basic subscription, access to computing nodes dedicated to processing certain object types, access to certain clusters with greater queue length, etc.).

As a result, responsive to the management system detecting that a timeout threshold (in terms of number or frequency of timeout events over a prescribed period) is reached, the management system 192 may send a message to a pre-established entity (e.g., an enterprise or cluster administrator, cluster installer, computing node manufacturer, etc.) that identifies the lack of capacity and signals a need for increased processing capacity through the procurement (e.g., purchase) of one or more additional computing nodes, the service of certain computing nodes that are associated with sensors experiencing higher than normal timeout events, the replacement of one or more existing computing nodes, or the formation of one or more additional clusters to service the number of sensors and type of traffic at the customer's premises.

Where the management system 192 is operating as a cloud-based management system, based on statistics produced from an aggregate of all reported analytic data associated with timeout events for managed sensors within the threat detection system, the management system 192 may send a message to the pre-established entity that suggest a change of subscription level to service a customer's increasing needs. As describe above, this message may be based on the management system detecting that the timeout threshold has been reached. It is contemplated that the management system 192 may aggregate statistics associated with different network devices, including on-premises management systems for example, which support the change of subscription level. The statistics may be based on a per sensor basis or across sensors (in the aggregate) supported at the customer's premises, as described above. Additionally, or in the alternative, the statistics may be based on a per cluster basis or another type of granularity.

Referring to FIG. 7, a flow diagram of operations conducted by an exemplary embodiment of logic implemented within the analysis coordination system $220_1$ of FIG. 5A and the object analysis system $240_1$ of FIG. 5B is shown. As described in FIG. 6, in response to the pre-analysis (filtering) logic 510 determining that the threat detection system 100 has not processed any objects identical or substantially related to the suspicious object 204, the pre-analysis (filtering) logic 510 creates a storage entry associated with the suspicious object 204, including the UID 211 along with the representative content 210, the sensor ID 207 and the operation mode identifier 212 that are provided as part of the metadata 206, into the distributed data store 170. The portions of the metadata 206 are subsequently uploaded to the distributed queue 175.

Within the object analysis system $240_1$, the capacity determination logic 560 determines whether the computing node $160_1$, which features the object analysis system $240_1$, has sufficient processing capacity to handle an in-depth malware analysis of a suspicious object associated with the aggregated metadata 206. This may involve an analysis of the operating state of the computing node $160_1$, such as determining whether the current processing capacity of the processor 400 of FIG. 4 falls below a load threshold (e.g., 90%), the number of virtual machines available for behavioral analysis of the suspicious object 204 is greater than a selected threshold (e.g., 10 virtual machines), or the like. This logic provides load balancing capabilities without requiring synchronization of the computing nodes.

If the operating state of the computing node $160_1$ would support performance of a malware analysis of a suspicious object, the capacity determination logic 560 notifies the queue access logic 562 to commence selection of metadata from the distributed queue 175 of FIG. 2. The selection may be based on a First-In-First-Out (FIFO) queue selection scheme where the oldest metadata awaiting processing by any analysis system is selected. Of course, it is contemplated that the selection may be arranged in accordance with another scheme, such as a level of suspiciousness of the object, anticipated object type, sensor priority where certain sensors may be located to protect certain highly sensitive resources within the enterprise network, or the like.

It is contemplated that the queue access logic 562 may include timeout monitor logic 563 that determines whether the portion of the metadata 206 removed from the distributed queue 175 has experienced a timeout. If so, the timeout monitor logic 563 provides the UID and sensor ID associated with the metadata 206 to the reporting logic 590 via the communication path 568. In response, the reporting logic 590 is configured to provide the timeout event information 591 to the distributed data store 170 and/or the notification logic 380 of the sensor $110_1$ of FIG. 2 when the object analysis system $240_1$ is operating in active mode. When operating in passive mode, as identified by the operation mode identifier 212 within the metadata 206, the analytic results and any detected timeout events determined by timeout monitor logic 563 are made available to a requesting network device. Hence, the timeout monitor logic 563 monitors a different level of analysis granularity than the timeout monitoring logic 530 of FIG. 6, namely the analysis latency of computing node $160_1$.

Upon receipt of the metadata 206, the content retrieval logic 564 commences retrieval of the suspicious object 204 that corresponds to the metadata. First, the content retrieval logic 564 obtains the sensor ID 207 that identifies sensor $110_1$ submitted the metadata 206 and is responsible for storage of the suspicious object 204. Second, besides the sensor ID 207, the content retrieval logic 564 further obtains the UID 211 accompanying the metadata 206 for use in identifying the suspicious object 204. The content retrieval logic 564 sends the request message 565 including the sensor ID 207 and the UID 211 as parameters to logic 396 that manages accesses to the content data store 395 (sometimes referred to as "data store management logic") and awaits the response message 566 that includes a link to the object (from which the object may be accessed) or the suspicious object itself (i.e., suspicious object 204). Although not shown, it is contemplated that an object stored in the content data store 395 is deleted in response to a timeout event occurring for that object, as detected by the timeout monitoring logic 370.

Thereafter, the returned information (link to object or object) may be temporarily stored in a data store 700 awaiting processing by the object processing logic 570, which includes one or more of the static analysis logic subsystem 582, the behavior analysis logic subsystem 584, and/or the emulation analysis logic subsystem 586. The control logic 580 controls the processing of the suspicious object 204.

More specifically, the object processing logic 570 includes the static analysis logic subsystem 582, the behavior analysis logic subsystem 584, and/or the emulation analysis logic subsystem 586 as well as the correlation/classification logic 588 and the control logic 580. Although the analysis logic 582, 584 and 586 disposed within the object analysis system $240_1$ is shown in a parallel topology, it is contemplated that the analysis logic 582, 584 and 586 may be communicatively coupled in a serial configuration or a daisy-chain configuration. It should be appreciated that the static analysis logic subsystem 582, the behavior analysis logic subsystem 584, the emulation analysis logic subsystem 586, the correlation/classification logic 588, and the reporting logic 590 may each be separate and distinct components, but any combination of such logic may also be implemented in a single memory block and/or core.

According to one embodiment, it is contemplated that the metadata 206 that may be used, at least in part by a virtual machine manager (VMM) 710, for provisioning one or more virtual machines 720 in the behavior analysis logic subsystem 584. The one or more virtual machines (VMs) 720 may conduct run-time processing of at least some of the information associated with the suspicious object 204. It is contemplated that the metadata 206 may include data directed to the object type (e.g., PDF file, word processing document, HTML (web page) file, etc.), the type of operating system at the source that provided the object 160, web browser type, or the like.

Additionally, or in an alternative, the metadata 206 may further include information that may be utilized by the correlation/classification logic 588 for classifying the suspicious object 204. The metadata 206 may include information associated with the delivery mechanism for the suspicious object 204 which, depending on the object type, may include information extracted from a header of a packet (e.g., source IP address, destination IP address, etc.) or from the body or header of the email message (e.g., sender's email address, recipient's email address, subject line, etc.). Hence, although not shown in detail, the metadata 206 may operate as another analysis type in addition to the static analysis (characteristics), dynamic analysis (behaviors), and/or emulation (e.g., emulation results).

Referring still to FIG. 7, the static analysis logic subsystem 582 is configured to inspect information associated with the suspicious object 204 using logic models 730 for anomalies in characteristics such as formatting anomalies for example. In some embodiments, the static analysis logic subsystem 582 may also be configured to analyze the suspicious object 204 for certain characteristics, which may include the object's name, type, size, path, or protocols. Additionally, or in the alternative, the static analysis logic subsystem 582 may analyze the suspicious object 204 by performing one or more checks, including one or more signature checks, which may involve a comparison between (i) content of the suspicious object 204 and (ii) one or more pre-stored signatures associated with known malware. In one embodiment, pre-stored signatures may be stored on the distributed data store 170. Checks may also include an analysis to detect exploitation techniques, such as any malicious obfuscation, using for example, probabilistic, heuristic, and/or machine-learning algorithms.

Additionally, the static analysis logic subsystem 582 may feature a plurality of rules that may be stored on the data store 700, for example, wherein the rules control the analysis conducted on the suspicious object 204. The rules may be based, at least in part, on machine learning; pattern matching; heuristic, probabilistic, or determinative analysis results; experiential knowledge; analyzed deviations in messaging practices set forth in applicable communication protocols (e.g., HTTP, HTTPS, TCP, etc.); analyzed compliance with certain message formats established for the protocol (e.g., out-of-order commands); and/or analyzed header or payload parameters to determine compliance. It is envisioned that the rules may be updated from an external source, such as via a remote source (e.g., threat intelligence network), in a periodic or aperiodic manner.

It is envisioned that information associated with the suspicious object 204 may be further analyzed using the behavior (dynamic) analysis logic subsystem 584. Herein, the behavior analysis logic subsystem 584 features the VMM 710 and one or more virtual machines (VMs) 720, namely $VM_1$ $725_1$-$VM_R$ $725_R$ (R≥1), and monitoring logic 730. One or more of the VMs $725_1$-$725_R$ are configured to process the suspicious object 204, and the behaviors of the suspicious object 204 and/or VM(s) $725_1$-$725_R$ may include anomalous behaviors. In general terms, each of the VMs 720 includes at least one run-time environment, which features a selected operating system and one or more applications to process the suspicious object 204, which is expected for the type of suspicious object 204 under analysis or based on the targeted destination for the suspicious object 204. For instance, where the suspicious object 204 is a URL, the run-time environment may include a specific OS type along with one or more web browser applications. Herein, the control logic 580 or logic within the dynamic analysis logic subsystem 584 may be adapted to provision one or more VMs $725_1$-$725_R$ (e.g., $VM_1$-$VM_R$) using information within the metadata 206 and/or information from the static analysis logic subsystem 582.

Herein, it is contemplated that the VMs $725_1$-$725_R$ may be provisioned with the same or different guest image bundles, where one VM $725_1$ may be provisioned with one or more application instances supporting a first type of operating system (e.g., Windows®) while another VM $725_2$ may be provisioned with a second type of operating system (e.g., MAC® OS X) supporting one or more other application instances. Furthermore, VMs $725_1$-$725_R$ may be provisioned with customer specific guest image instances. According to one embodiment, the provisioning may be accomplished through a customer preference configuration option that is uploaded to the VMM 710 of the dynamic analysis logic subsystem 584. The configuration option may be structured to identify the application version(s) and/or operating system(s) supported by the VMs $725_1$-$725_R$. As an illustrative embodiment, each VM $725_1$ . . . or $725_R$ may be provisioned with one or more guest images directed to a single application version/operating system version (e.g., Microsoft® Word 2013 and Windows® 7 OS), multiple (two or more) application versions and a single OS version (e.g., Microsoft® Words® applications supported by Windows® 10 OS), multiple application versions and multiple OS versions (e.g., Microsoft® Words® applications supported by one or more Windows®-based OSes or MAC®-based OSes), or even single application and multiple OS deployment.

Additionally, the VMs $725_1$-$725_R$ for each computing node may be provided for dedicated processing of a certain object type such as emails, network traffic including webpages/URLs, or the like. For this configuration, it is contemplated that queue $175_1$ may be segmented in which one or more portions of the queue $175_1$ are reserved for metadata associated with the certain object type while other object types are maintained in another portion of the queue $175_1$. In lieu of segmenting queue $175_1$, it is further contemplated that a different queue may be assigned for objects of the certain object type.

Furthermore, it is contemplated that the VMs within the object analysis systems (e.g., VMs $725_1$-$725_R$ of object analysis system $240_1$) may be provisioned so that different object analysis systems (computing nodes) support different types or levels of malware analysis. For instance, computing node $160_1$ of FIG. 2 may be configured to support malware analyses directed to email communications while computing node $160_2$ may be configured to support malware analyses directed to webpage/URL network traffic. Also, the computing node $160_1$ may be configured to support more in-depth malware analyses or more recent code releases than computing node $160_2$. As an example, computing node $160_1$ of FIG. 2 may be configured to support (i) longer or shorter malware analyses, (ii) more in-depth malware analyses or (iii) more recent code releases than computing node $160_2$ of FIG. 2.

Monitoring logic 730 within the dynamic analysis logic subsystem 584 may observe one or more behaviors with respect to the suspicious object 204 that are attributable to the object 204 or attributable to the execution of the object 204 within one or more VMs 720. These monitored behaviors may be used in a determination by the correlation/classification logic 588 as to whether the suspicious object 204 is associated with malware (i.e., the likelihood of the suspicious object 204 including malware and deemed malicious exceeds the second prescribed threshold). During processing of certain types of objects, such as the URL for example, the one or more VMs 720 (e.g., VM $725_1$) may initiate a request message or successive request messages 567 to data store management logic 396 via the content retrieval logic 564 for additional information prompted through the processing of the URL. This information may involve web pages that would have been accessed during activation of the URL as well as objects within the web pages themselves. If the requested information is available, the data store management logic 396 returns the requested information via the content retrieval logic 564, operating as a proxy, to the VM $725_1$. If the requested information is not available, however, the control logic 580 operating alone or in combination with other logic (e.g. the emulation analysis logic 586) may serve the request to enable the VM $725_1$ to continue processing the URL (suspicious object 204).

As further shown in FIG. 7, the suspicious object 204 may be further analyzed using the emulation analysis logic subsystem 586, which is configured so as to enable the analysis system $240_1$ to behave like any another computer system ("guest" system). It is envisioned that the emulation analysis logic subsystem 586 may be configured so as to enable the analysis system $240_1$ to simulate the operations of any of various software, applications, versions and the like, designed for the guest system. More specifically, the emulation analysis logic subsystem 586 may be configured so as to model hardware and software.

It should be understood that the static analysis logic subsystem 582, the dynamic analysis logic subsystem 584, the emulation analysis logic subsystem 586, the correlation/classification logic 588, and/or the reporting logic 590 may be implemented as one or more software modules executed by one or more processors as shown in FIGS. 4 & 5A-5B.

As further shown in FIG. 7, the correlation/classification logic 588 includes attribute correlation logic 740, threat index generation logic 750 and object classification logic 760. Herein, the attribute correlation logic 740 is configured to receive results $770_1$, $770_2$ and/or $770_3$ from logic subsystems 582, 584 and/or 586, respectively. The attribute correlation logic 740 attempts to correlate some or all of attributes (e.g., behaviors and/or characteristics) within the results $770_1$-$770_3$ associated with the suspicious object 204 in accordance with a prescribed correlation rule set (not shown). The correlation rule set may be stored locally or in the data store 700 and may be updated. For this embodiment, the correlation determines what particular attributes and/or combination of attributes have been collectively detected by the static analysis logic subsystem 582 and dynamic analysis logic subsystem 584 in accordance with the attribute patterns set forth in the correlation rule set.

Herein, as a non-limiting illustration, the attributes and/or combinations of attributes constitute contextual information associated with the suspicious object 204, which is provided to the threat index generation logic 750 to determine one or more threat indices. The operability of the threat index generation logic 750 is controlled by a threat index data set (not shown), which may be stored locally or within the data store 700. The one or more threat indices are used by the object classification logic 760 to determine whether or not the suspicious object 204 is malicious, where such analysis is described in U.S. patent application Ser. No. 14/986,416 entitled "Malware Detection System With Context Analysis," filed Dec. 31, 2015, the entire contents of which are incorporated by reference.

The analytic results 780 from the correlation/classification logic 588 along with certain portions of the metadata associated with the object (e.g., UID) are provided to the reporting logic 590. The reporting logic 590 may generate alerts directed to the client administrators or management system as shown in FIG. 1. Also, the reporting logic 590 may provide (i) at least a portion of the analytic results 595 to the distributed data store 170 for storage in accordance with the UID associated with the analyzed, suspicious object, or (ii) at least the portion of the analytic results 595 to metadata data store 390 via the notification logic 380.

B. Synchronous Load Balancing Architecture

As an alternative embodiment to the asynchronous load balancing architecture described above, a synchronous load balancing architecture may be utilized as depicted in FIGS. 8-10 and described below. Each of these architectures includes one or more sensors and one or more clusters of computing nodes. As shown in FIG. 8, the cluster $150_1$ comprises a plurality of computing nodes $160_1$-$160_P$ ($P \geq 1$, P=4) where each computing node (e.g., computing node $160_1$) comprises an analysis coordination system $800_1$ and an object analysis system $820_1$. The analysis coordination system $800_1$ may be activated or deactivated, where the computing node $160_1$ operates as a "broker" computing node when the analysis coordination system $800_1$ is activated or operates as an "analytic" computing node when the analysis coordination system $800_1$ is deactivated.

Differing from the asynchronous load balancing architecture illustrated in FIG. 2, each object analysis system $820_1$-$820_4$ within the cluster $150_1$ is configured to provide load information 825 to each active analysis coordination system within the same cluster $150_1$ (e.g., analysis coordination system $800_1$ and $800_2$). The active analysis coordination systems $800_1$ and $800_2$ are responsible for performing load balancing operations for the cluster $150_1$. The load information 825 may include information directed to the amount of computational work currently being performed by the object analysis system, where the amount of computational work may be represented by one or more measurable factors, including number of analyses of objects being currently performed, the number of virtual machines being utilized, processor load or processor utilization, or the like. Hence, the analysis coordination systems $800_1$ and $800_2$ are responsible for selecting the particular object analysis system $820_1$, . . . , or $820_4$ based, at least in part, on workload.

Herein, the load balancing for each of the object analysis system $820_1$-$820_4$ avoids bottlenecks or long latencies. However, it is contemplated that more complex considerations may be used besides load. For instance, where the loads are equivalent but the object analysis system $820_1$ begins to operate in a degraded mode, one or more of the other object analysis systems $820_2$, . . . , or $820_4$ will need to increase performance.

As shown, for a communication session, sensors $110_1$-$110_M$ are communicatively coupled directly to the first cluster $150_1$ via a broker computing node, where each sensor $110_1$-$110_M$ is assigned to a particular broker computing node during registration process and this assignment is assessed periodically or aperiodically in case an adjustment is needed due to workload. Herein, each sensor $110_1$, . . . , or $110_M$ is configured to transmit a first message 830 (e.g., a Hypertext Transfer Protocol "HTTP" transmission) as a data submission to its assigned analysis coordination system $800_1$ or $800_2$. As shown, sensor $110_1$ transmits the data submission 830 to analysis coordination system $800_1$ and may be configured to monitors timeout events as described above and illustrated in FIG. 6.

In the event that this transmission is associated with a new communication session, the analysis coordination system $800_1$ conducts a load balance analysis and selects one of the object analysis systems $820_1$-$820_4$ to handle malware analysis for an object 835 that has been detected by the sensor $110_1$ as suspicious. An identifier 840 of the selected object analysis system, sometimes referred to as a "cookie", is returned to the sensor $110_1$ from the analysis coordination system $800_1$.

In response to receiving the cookie 840 and without terminating the communication session, the sensor $110_1$ transmits a second message 850 to the selected object analysis system (e.g., object analysis system $820_3$). The second message 850 includes the object 835 for analysis, metadata 836 associated with the object 835, the identifier 840 of the selected object analysis system $820_3$ as a targeted destination, and an identifier 860 of the sensor $110_1$ as a source. The analysis coordination system $800_1$ translates the identifier 840 to appropriate address information of the selected object analysis system $820_3$ and redirects the second message 850 to the selected object analysis system $820_3$ for conducting malware analysis on the object 835.

Similar to the operations described in FIG. 2, prior to the communication exchange with the assigned analysis coordination system $800_1$, the sensor $110_1$ is configured to receive incoming data that includes the object 835 and corresponding metadata 836. Upon receipt of the incoming data, the sensor $110_1$ separates the metadata 836 from the object 835 and conducts a preliminary analysis of the object 835 to determine whether the object 835 is suspicious (e.g., a first prescribed level of likelihood that the object includes malware). The preliminary analysis may include one or more checks being conducted on the object 835 and/or the metadata 836 (e.g., bit pattern comparisons, blacklist or whitelist analysis, etc.).

Upon failing to determine that the object 835 is suspicious, the sensor $110_1$ avoids transmission of the first message 830 that initiates an in-depth malware analysis of the object 835. However, in response to the sensor $110_1$ detecting that the object 835 is suspicious, the sensor $110_1$ transmits the first message 830 to initiate the communication session and commence routing of the object 835 to a selected object analysis system.

Referring to FIG. 9, a block diagram of an exemplary embodiment of the logic implemented within a computing node $160_1$ configured in accordance with the synchronous load balancing architecture is shown, where the computing node $160_1$ is configured in accordance with the synchronous load balancing architecture of FIG. 8. Herein, the computing node $160_1$ features the analysis coordination system $800_1$ and the object analysis system $820_1$. The analysis coordination system $800_1$ is communicatively coupled to object analysis systems $820_3$ and $820_4$ of computing nodes $160_3$ and $160_4$, respectively. Herein, the communications with the object analysis system $820_2$ are not shown for clarity purposes.

As shown, the analysis coordination system $800_1$ features a proxy server 900 communicatively coupled to the load balancer 910. The proxy server 900 is responsible for determining whether the data submission 830 from the sensor $110_1$ includes a cookie, which denotes an object analysis system targeted to receive the data submission. The load balancer 910 is responsible for the handling of load balancing for the object analysis systems $820_1$-$820_4$ within the cluster $150_1$. As shown, load balancer 910 receives load information 825 from load monitors 920₁-920₃ that are configured to monitor workload of the object analysis systems 820₁-820₃, respectively.

Herein, in response to receipt of the first message 830 from the sensor 110₁, the proxy server 900 determines whether the first message 830 includes a cookie 840 that identifies one of the object analysis systems within the cluster 150₁. If no cookie is found, the proxy server 900 forwards the first message 830 to the load balancer 910, which returns a message 930 with the assigned cookie 840 identifying the selected object analysis system (e.g., object analysis system 820₃) to the proxy server 900. Thereafter, the proxy server 900 returns at least the cookie 840 from the message 930 to the server 110₁, which causes the sensor 110₁ to transmit the second message 850, including the object 835 for analysis, back to the proxy server 900.

Upon receipt of the second message 850, the proxy server 900 redirects the second message 850 to a web server 940, which effectively provides an address (e.g., IP address) for the object analysis system 820₃ within the computing node 160₁. Thereafter, the web server 940 may parse the second message 850 to extract the object 835 for processing and the metadata 836 for use in VM configuration of the object processing logic 570, as described above.

Referring to FIG. 10, a block diagram illustrating an operational flow between exemplary embodiments of the sensor 110₁, analysis coordination system 800₁, and object analysis system 820₃ within the cluster 150₁ deploying a synchronous load balancing architecture is shown. Herein, in response to receipt of a message from the sensor 110₁ (operation "1"), the proxy server 900 determines whether the message includes a cookie that identifies one of the object analysis systems within the cluster 150₁. If no cookie is found, the proxy server 900 forwards the message to the load balancer 910 (operation "2"), which returns a message with an assigned cookie identifying the selected object analysis system (e.g., object analysis system 820₃) to the proxy server 900 (operation "3"). Thereafter, the proxy server 900 returns contents of the message to the server 110₁ (operation "4"). The receipt of the returned message causes the sensor 110₁ to transmit a second message, including the object for analysis along with its metadata, back to the proxy server 900 (operation "5").

Upon receipt of the second message, the proxy server 900 redirects the second message to the web (API) server 940 (operation "6"), which parse the second message to extract the object 835 for processing and the metadata 836 for use in VM configuration of the object processing logic 570 (operation "7"). Within the objet processing logic 570, the object 835 undergoes static analysis, behavioral (dynamic) analysis and/or emulation analysis to produce attributes that are analyzed by correlation/classification logic to determine whether the object 835 is associated with malware. The results of the analysis by the object processing logic 570 may be returned to the proxy server 900 (operation "8"), and subsequently made available to the sensor 110₁ through a push or pull data delivery scheme (operation "9").

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A sensor configured to operate in cooperation with a cluster of computing nodes including a first computing node that conducts at least a malware analysis directed to an object submitted to the cluster where the malware analysis includes a behavioral analysis of the object, the sensor comprising:
 a processor; and
  a memory communicatively coupled to the processor, the memory comprises
  result aggregation logic that, during execution by the processor, is configured to access a first data store associated with the cluster for retrieval of results of a malware analysis of metadata associated with the object, and
  timeout monitoring logic communicatively coupled to the result aggregation logic, the timeout monitoring logic, during execution by the processor, is configured to (a) determine that a timeout event has occurred when (i) a timeout period associated with the object that identifies a duration of time for completing the malware analysis on the object by the cluster has expired as determined, by the first computing node, when a duration of retention of the metadata associated with the object in the first data store exceeds a timeout value included as part of the metadata, and (ii) no results of the malware analysis of the object have been stored in the first data store as provided by the result aggregation logic, and (b) report information associated with the timeout event to a management system that is configured to aggregate timeout events including the timeout event and further determine that the sensor is operating in an overloaded state based on a number of timeout events determined by the timeout monitoring logic within a prescribed time period.

2. The sensor of claim 1, wherein the timeout period being the duration of time assigned for completing the malware analysis on the object is based, at least in part, on a data type of the object where the timeout period assigned for the object of a first data type is longer in duration than the timeout period assigned for the object of a second data type.

3. The sensor of claim 1, wherein the timeout period is either (i) dynamic being based on one or more of a plurality of factors, including a system load and a queue length for metadata associated with objects awaiting malware analyses by the cluster, or (ii) based, at least in part, on a subscription level determined for the sensor.

4. The sensor of claim 1 further comprising:
 notification logic communicatively coupled to the timeout monitoring logic that, upon execution by the processor, is configured to receive information associated with a timeout event for the malware analysis of the metadata associated with the object.

5. The sensor of claim 1, wherein the timeout monitoring logic determines whether a timeout event has occurred and notifies the processor operating within the sensor of the timeout event.

6. The sensor of claim 1 further comprising monitoring logic that, when executed by the processor, computes the timeout value representing an amount of time left for processing the object and completing the malware analysis of the metadata associated with the object upon transmission of the object to the cluster, the timeout value being based on the timeout period.

7. The sensor of claim 6, wherein the timeout monitoring logic is configured to remove the metadata associated with the object stored in the first data store in response to the timeout monitoring logic detecting the timeout event for the object.

8. The sensor of claim 6 further comprising notification logic to receive results of the malware analysis on the metadata associated with the object and alter an entry in a second data store associated with aggregated metadata when no timeout event has been experienced during processing of the object.

9. The sensor of claim 1, wherein the processor is configured to upload one or more messages to a management system that include reporting information associated with an aggregate of one or more timeout events detected by the timeout monitoring logic, the reporting information includes at least three of (i) a sensor identifier; (ii) a timestamp that denotes a time of receipt of the object or time of detection of a level of suspicious that necessitated analysis of the object by the cluster; (iii) the timeout value that denotes an amount of time allocated by the sensor to complete the malware analysis of the object; (iv) representative content of the suspicious object; and (v) an identifier of the object.

10. The sensor of claim 1, wherein the processor determines whether to resubmit the object for analysis by the cluster, where the determination is based, at least in part, on a type of object or a level of suspiciousness associated with the object.

11. The sensor of claim 1 being communicatively coupled to at least the first computing node of the computing nodes and the first computing node comprises:
   a hardware processor; and
   a non-transitory storage medium communicatively coupled to the hardware processor, the storage medium comprises
   a first analysis coordinator that, when executed by the hardware processor, is configured to conduct an analysis of the metadata associated with the object that is to be analyzed for malware, the metadata being received from a remotely located network device and to store a portion of the metadata within the first data store, and
   a first object analyzer that, when executed by the hardware processor, is configured to retrieve the portion of the metadata from the first data store, monitor the duration of retention of the metadata in the first data store, and determine whether the timeout event has occurred for the object associated with the metadata based on retention of the metadata within the first data store for the duration exceeding the timeout value included as part of the metadata associated with the suspicious object for malware.

12. The sensor of claim 11, wherein the timeout value included as part of the portion of the metadata identifies an amount of time remaining from the timeout period allocated to complete malware analysis of the object.

13. The sensor of claim 1, wherein the results of the malware analysis on the object include information that identifies the metadata associated with the object has not been timely processed by a computing node of the cluster of computing nodes, including the first computing node, during malware analysis of the object.

14. The sensor of claim 1 being communicatively coupled to the management system, the management system being configured to cause the sensor to commence a re-enrollment process that includes at least sending a message to an administrator suggesting a change in tier subscription by the sensor in response to the sensor operating in the overloaded state.

15. The sensor of claim 1, wherein the timeout monitoring logic further determines whether timeout events have occurred for a plurality of objects under analysis, including the object, due to failure by the sensor to timely upload metadata associated with the plurality of objects, including the metadata associated with the object, for analysis.

16. The sensor of claim 15, wherein the timeout monitoring logic is configured to report information associated with the timeout events to the management system, the management system to aggregate the timeout events and further determine that the sensor is operating in the overloaded state based on a frequency of occurrences of the timeout events over the prescribed time period.

17. The sensor of claim 15, wherein the management system to cause the sensor to commence a re-enrollment process in response to the sensor operating in the overloaded state, the re-enrollment process causing the sensor to establish communications with a second cluster different than the cluster.

18. A sensor configured to operate in cooperation with at least a first computing node of a cluster of computing nodes that conduct malware analyses directed to objects received by the sensor, the sensor comprising:
   a processor; and
   a memory communicatively coupled to the processor, the memory includes a first timeout monitoring unit implemented to monitor for timeout events occurring during the malware analyses of information associated with the received objects that may signify the sensor is operating in an overloaded state in conducting the malware analyses to transmit at least a portion of the information associated with the timeout events to a management system,
   wherein a timeout event of the timeout events occurs when (i) a timeout period associated with one of the received objects identifying a duration of time for completing a malware analysis of the malware analyses on the one of the received objects has expired, as determined by the first computing node, when a duration of retention of metadata associated with the one of the received objects exceeds a timeout value included as part of the metadata, and (ii) no results of the malware analysis on the one of the received objects are detected, and
   wherein the sensor receives a message from the management system suggesting a change in subscription level to increase malware analysis capabilities of the sensor from a current subscription level responsive, at least in part, to the management system identifying, based on the timeout events, that the sensor is operating in the overloaded state.

19. The sensor of claim 18, wherein the overloaded state signifies the sensor is unable to conduct a preliminary analysis of incoming information and the timeout events are occurring due to a failure by the sensor to timely upload data submissions including the metadata associated with the one of the received objects for analysis.

20. The sensor of claim 18, wherein the information associated with the timeout events is transmitted to the management system to issue a signal for the sensor to commence a re-enrollment process in response to the management system determining that the sensor is operating in the overloaded state.

21. The sensor of claim 20, wherein the re-enrollment process causes the sensor to establish a communicative coupling with another cluster.

22. A sensor configured to operate in cooperation with at least a first computing node of a cluster of computing nodes that conducts at least a malware analysis directed to an object submitted to the cluster, the sensor comprising:

a hardware processor;

result aggregation logic that, upon execution by the hardware processor deployed within the sensor, is configured to access a first data store associated with the cluster for retrieval of results of a malware analysis of metadata associated with the object; and timeout monitoring logic communicatively coupled to the result aggregation logic, the timeout monitoring logic, during execution by the hardware processor, is configured to (a) determine that a timeout event has occurred when (i) a time period associated with the object that identifies a duration of time for completing the malware analysis on the object by the cluster has expired as determined, by the first computing node, when a duration of retention of the metadata associated with the object in the first data store exceeds a timeout value included as part of the metadata and (ii) information associated with the object has not been timely submitted by the sensor to the cluster or received by the sensor after being processed by the cluster before expiration of the time period, and (b) report information associated with the timeout event to a management system that is configured to aggregate timeout events from the sensor, including the timeout event, to determine whether the sensor is operating in an overloaded state based on a number of timeout events determined by the timeout monitoring logic within a prescribed time period.

23. The sensor of claim 22, wherein the time period being the duration of time assigned for completing the malware analysis is based, at least in part, on a data type of the object where the time period assigned for the object of a first data type is longer in duration than the time period assigned for the object of a second data type.

24. The sensor of claim 22, wherein the time period is either (i) based on one or more of a plurality of factors, including a system load and a queue length for metadata associated with objects awaiting the malware analysis by the cluster, or (ii) based, at least in part, on a subscription level determined for the sensor.

25. The sensor of claim 22 further comprising:

notification logic communicatively coupled to the timeout monitoring logic that, upon execution by the hardware processor, is configured to receive information associated with the timeout event for malware analysis of metadata associated with the object.

26. The sensor of claim 22, wherein the timeout monitoring logic determines whether the timeout event has occurred and notifies the hardware processor operating within the sensor of the timeout event.

27. The sensor of claim 22 further comprising monitoring logic that, when executed by the hardware processor, computes the timeout value representing an amount of time left for processing the object and completing the malware analysis of the metadata associated with the object upon transmission of the object to the cluster, the timeout value being based on the time period.

28. The sensor of claim 27, wherein the timeout monitoring logic to remove the metadata associated with the object stored in the first data store in response to the timeout monitoring logic detecting the timeout event for the object.

29. The sensor of claim 27 further comprising notification logic to receive results of the malware analysis on the metadata associated with the object and alter an entry in a second data store associated with aggregated metadata when no timeout event has been experienced during processing of the object.

30. The sensor of claim 22, wherein the timeout monitoring logic is configured to report information associated with the timeout events to the management system, the management system to aggregate the timeout events and further determine that the sensor is operating in the overloaded state based on a frequency of occurrences of the timeout events over the prescribed time period.

* * * * *